United States Patent
Persson

(12) 
(10) Patent No.: US 10,906,435 B2
(45) Date of Patent: Feb. 2, 2021

(54) ADJUSTABLE CONNECTING BAR FOR A CHILD RESTRAINT SYSTEM

(71) Applicant: HOLMBERGS SAFETY SYSTEM HOLDING AB, Halmstad (SE)

(72) Inventor: Jan-Erik Persson, Vessigebro (SE)

(73) Assignee: HOLMBERGS SAFETY SYSTEM HOLDING AB, Halmstad (SE)

( * ) Notice: Subject to any disclaimer, the term of this patent is extended or adjusted under 35 U.S.C. 154(b) by 0 days.

(21) Appl. No.: 16/494,897

(22) PCT Filed: Mar. 6, 2018

(86) PCT No.: PCT/EP2018/055399
§ 371 (c)(1),
(2) Date: Sep. 17, 2019

(87) PCT Pub. No.: WO2018/172053
PCT Pub. Date: Sep. 27, 2018

(65) Prior Publication Data
US 2020/0017003 A1    Jan. 16, 2020

(30) Foreign Application Priority Data
Mar. 22, 2017 (SE) ........................................ 1750339

(51) Int. Cl.
*B60N 2/28* (2006.01)
*B60N 2/90* (2018.01)

(52) U.S. Cl.
CPC ............. *B60N 2/2887* (2013.01); *B60N 2/28* (2013.01); *B60N 2/919* (2018.02); *B60N 2002/952* (2018.02)

(58) Field of Classification Search
CPC ..... B60N 2/2887; B60N 2/289; B60N 2/2893
See application file for complete search history.

(56) References Cited

U.S. PATENT DOCUMENTS 8,454,089 B2 * 6/2013 Nett ..................... B60N 2/2887
297/253
10,589,645 B2 * 3/2020 Lagunar Herranz ........................
B60N 2/2887

FOREIGN PATENT DOCUMENTS

EP    0619201 A1    10/1994
EP    0703113 A2    3/1996
(Continued)

OTHER PUBLICATIONS

Swedish Search Report for Application No. 1750339-2 dated Dec. 7, 2017.
(Continued)

*Primary Examiner* — Timothy J Brindley
(74) *Attorney, Agent, or Firm* — Moser Taboada

(57) ABSTRACT

The present disclosure relates to an adjustable connecting bar for releasable fastening of a child restraint system to a vehicle seat having mounted anchoring members. The adjustable connecting bar (1) comprises a first and a second elongated bar member (2, 3) telescopically interconnected and arranged for relative displacement along a longitudinal axis (L). The first elongated bar member (2) is provided with a coupling device (4) at an end thereof and the coupling device (4) is transformable from a locked configuration to a release configuration in a first operation step by means of a manually operable actuator (8) which is operatively connected via a maneuvering system (9) to the coupling device. The connecting bar (1) further comprises a latch system (10, 11) housed within the connecting bar (1) for selectively preventing extension and retraction of the connecting bar (1). The latch system comprises a first latch (10) arranged to prevent retraction of the connecting bar (1) when the connecting bar (1) is in an extended end position and the coupling device (4) is in the release configuration. The second latch (11) is arranged to be transferrable from an
(Continued)

active state preventing extension of the connecting bar to an inactive state allowing both extension and retraction of the connecting bar (1). The second latch (11) is biased to the active state and transferrable from the active state to the inactive state in a second operation step by means of the manually operable actuator (8). The second operation step is separate from the first operation step and only allowed when the coupling device (4) is in the release configuration. The second latch (11) is arranged to return to the active state upon release of the manually operable actuator (8).

11 Claims, 14 Drawing Sheets

(56) References Cited

FOREIGN PATENT DOCUMENTS

| EP | 0970842 | A1 | | 1/2000 | | |
|----|---------|----|---|--------|---|---|
| EP | 1970247 | A1 | * | 9/2008 | ........... | B60N 2/2887 |
| EP | 2551150 | A2 | | 1/2013 | | |
| EP | 2623368 | A1 | * | 8/2013 | ........... | B60N 2/2821 |
| JP | 2002/293175 | A | | 10/2002 | | |
| WO | WO-2012/172001 | A1 | | 12/2012 | | |
| WO | WO-2015151181 | A1 | * | 10/2015 | ........... | B60N 2/2821 |
| WO | WO-2016/066802 | A1 | | 5/2016 | | |
| WO | WO-2017/186785 | A1 | | 11/2017 | | |

OTHER PUBLICATIONS

International Search Report and written opinion for application No. PCT/EP2018/055399, dated Jun. 8, 2018.

* cited by examiner

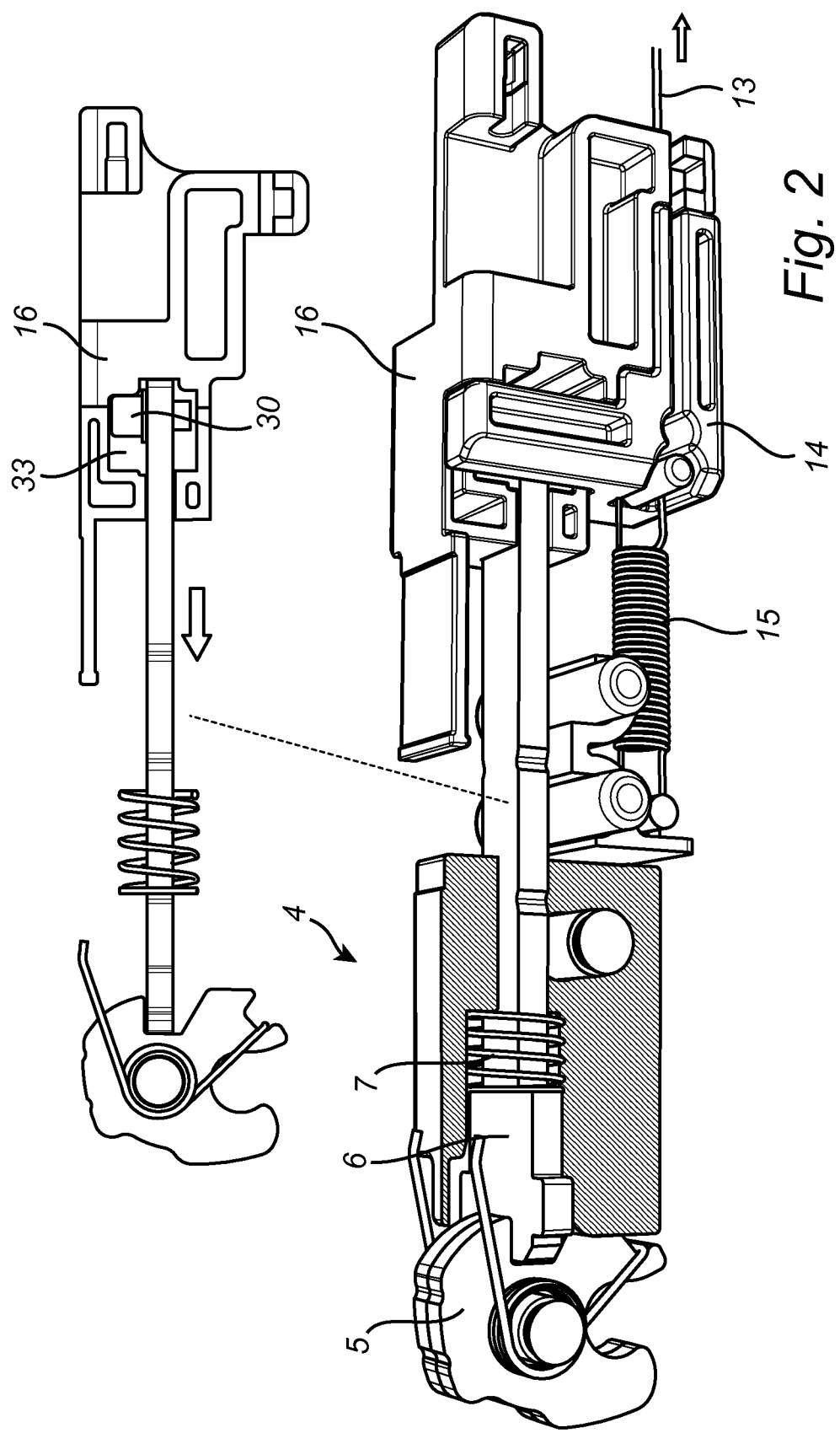

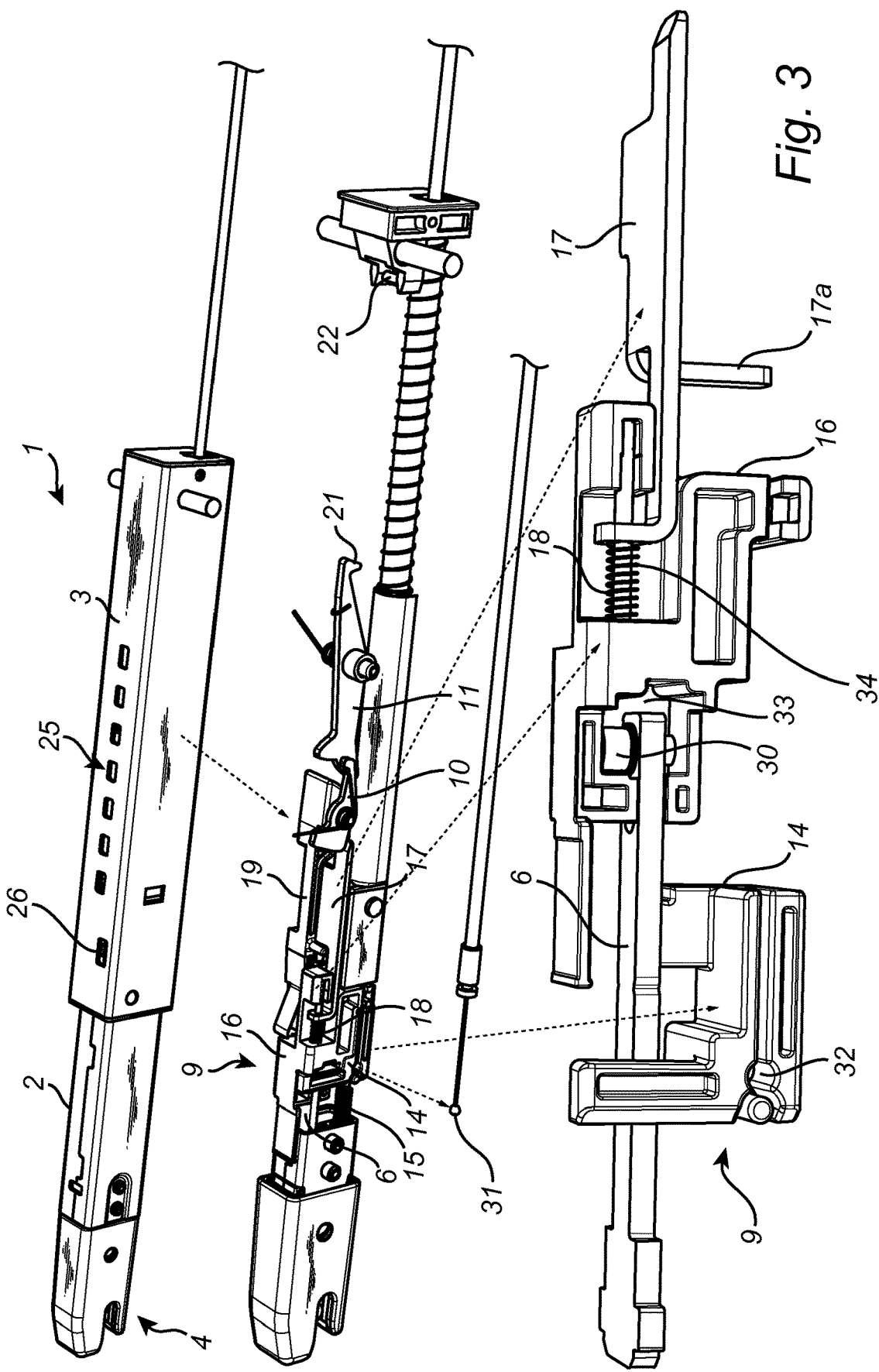

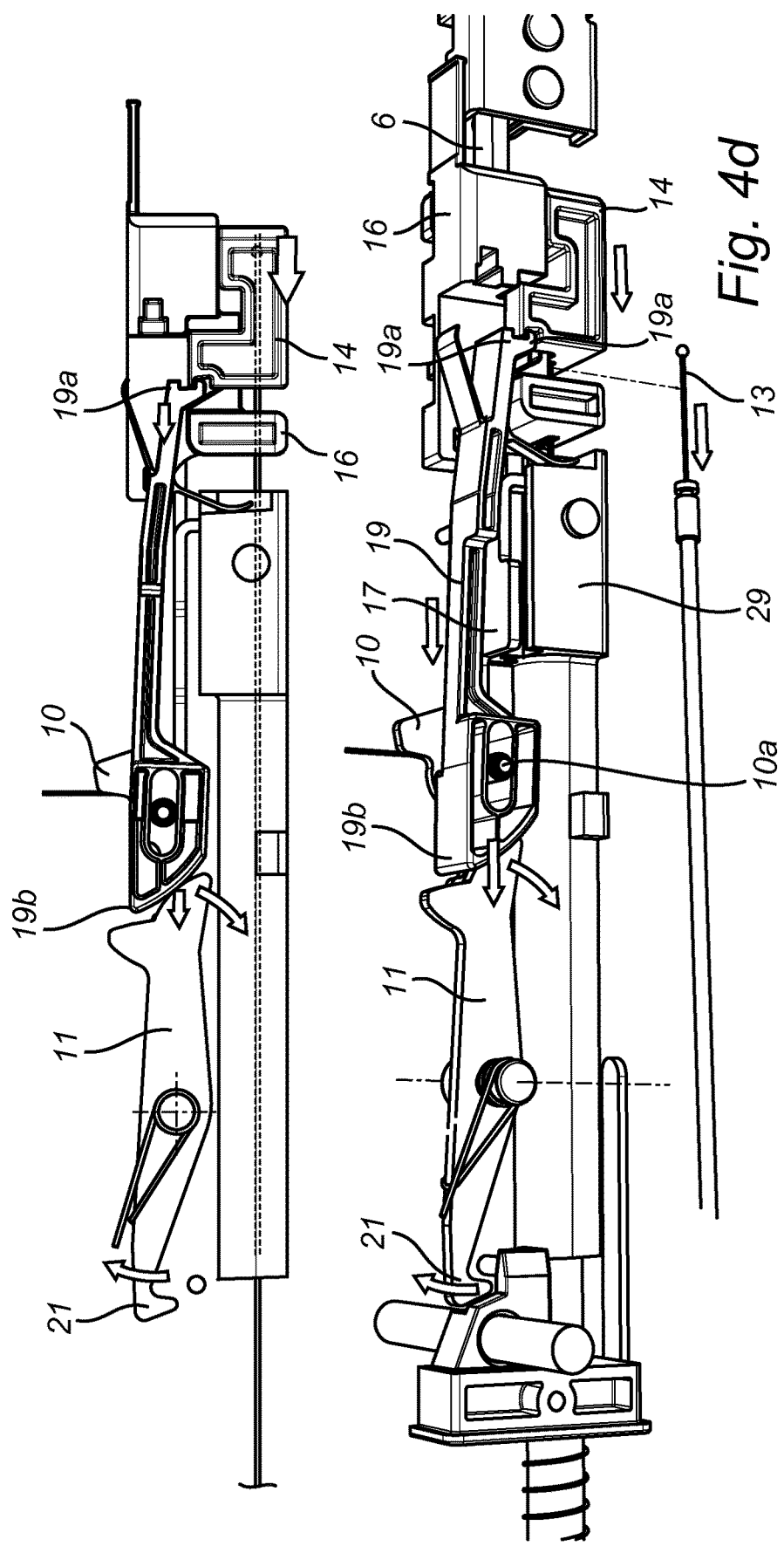

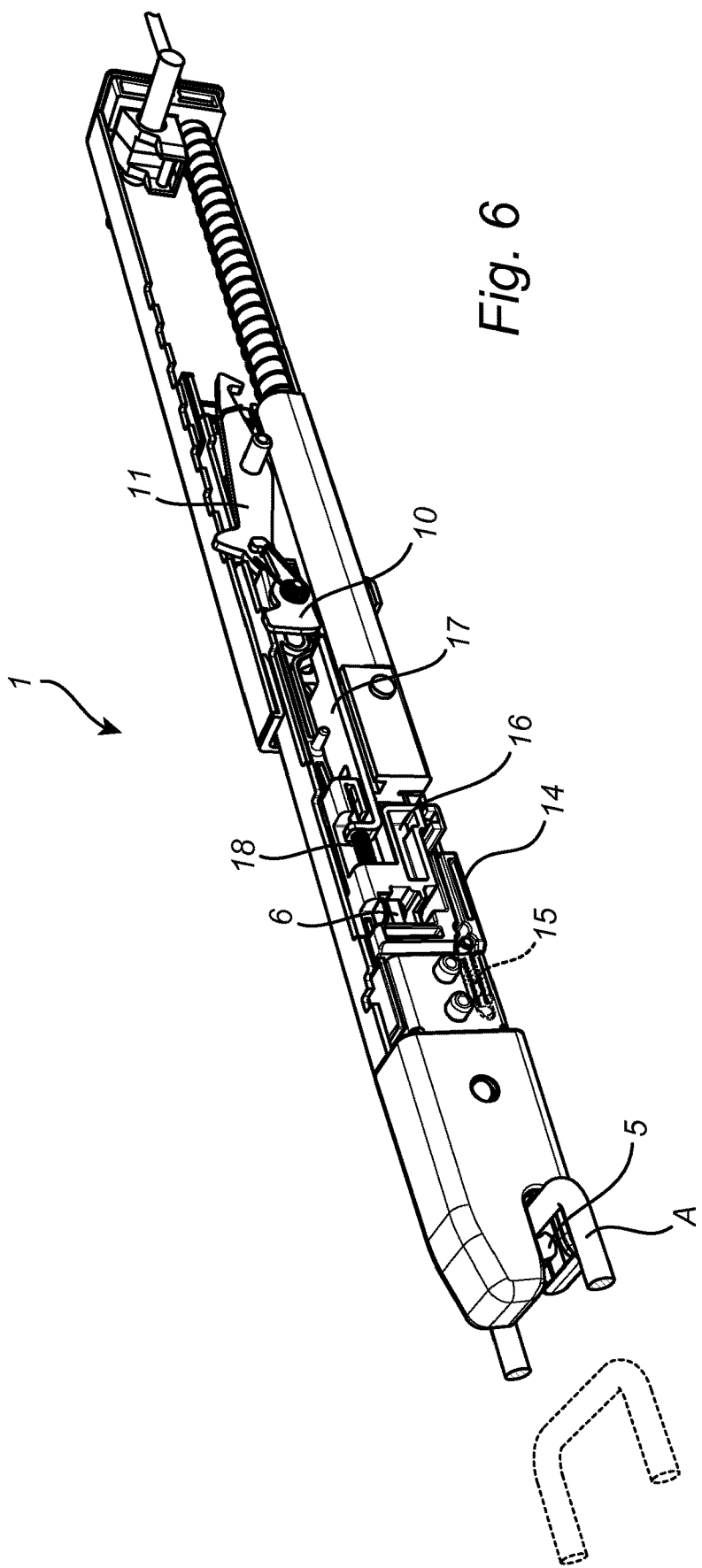

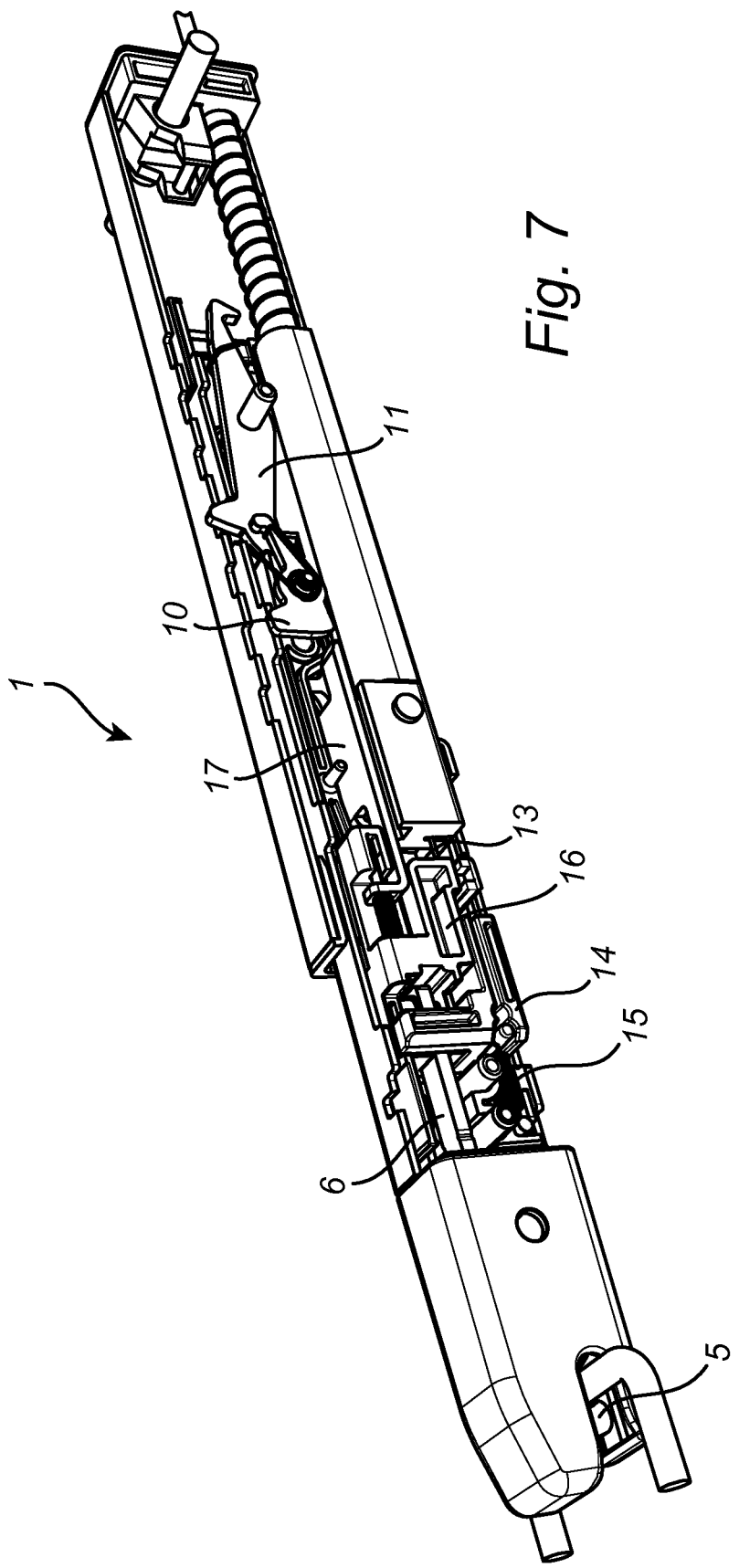

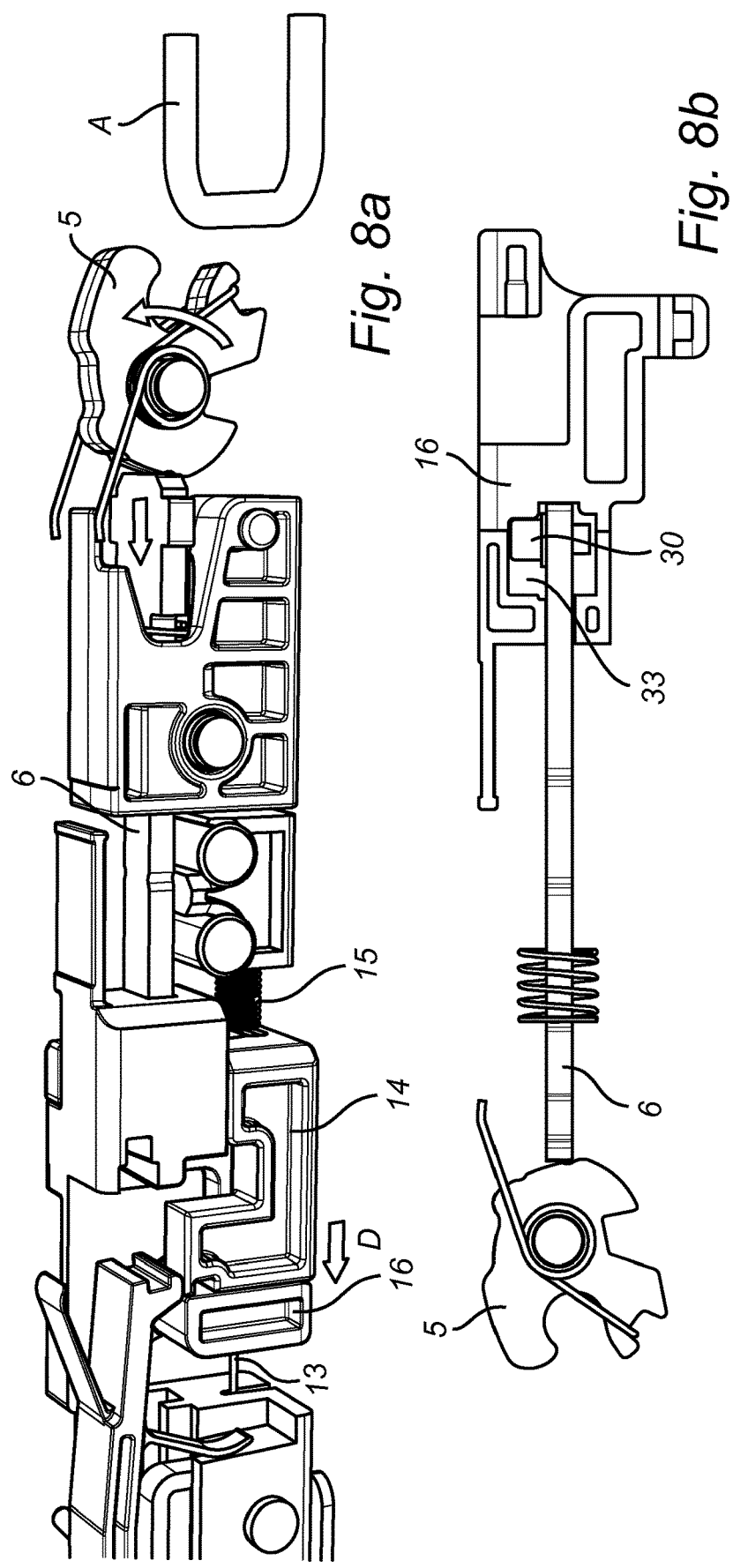

ADJUSTABLE CONNECTING BAR FOR A CHILD RESTRAINT SYSTEM

TECHNICAL FIELD

The present invention relates to an adjustable connecting bar for releasable fastening of a child restraint system to a vehicle seat having mounted anchoring members, and to an adjustable mounting arrangement containing a pair of adjustable connecting bars as well as to a child restraint system containing the same.

BACKGROUND OF THE INVENTION

It is standard practice to secure a child safety seat using releasable "alligator-like" connectors, which are rigidly coupled to the child safety seat, to fixedly mounted generally U-shaped rod-like anchoring members normally available at the bottom of the backrest of a passenger vehicle seat. Isofix systems are standardized in the international standard ISO 13216 that specifies this type of anchoring system for child safety seats. Examples of this type of connector are provided in EP 0619201 A1 and EP0703113 A2.

Child safety seats, also referred to as child restraint systems, are connectable using Isofix systems and include cushioned seat shells having seat and back portions, booster cushions with or without side bolsters, and baby carriers. Child safety seats may be integral or may include a seat/booster/baby carrier mounted on a chassis (also called base) which is connected using an Isofix system. The connectors may be arranged to be retractable between a use position, where the connectors are projecting from the child safety seat, and a stowed position, where the connectors are withdrawn and at least partly enclosed in the child safety seat.

The connection between the child safety seat and the vehicle seat must be as firm and rigid as possible. It is also desirable to provide for adjustment to varying vehicle seat inclinations, dimensions and shapes in order to ensure safe and secure mounting of the child safety seat.

EP 0970842 A1 relates to a mounting means comprising a chassis which is intended to be mounted in a stationary position on the seat bottom of a vehicle seat with the child seat facing forward, and on which two connectors are provided for co-operation with stationary anchoring means, and a carrier displaceable on the chassis, which allows displacement of the child seat towards and away from the seat back of the vehicle seat.

U.S. Pat. No. 8,454,089 B2 relates to a fastening device for a child safety seat comprising connecting elements provided at the leg ends of a bent connecting tube. The legs of the connecting tube are connected by a transversely extending base. The connecting tube hence forms a bow. The base of the bow is mountable in transverse grooves of a latching plate fixed on the child seat. The latching plate thus provides for latching and mounting the bow on the child seat in different longitudinal positions. These different longitudinal positions correspond to different lengths by which the connecting elements protrude from the child seat.

EP 2551150 B1 relates to a child safety seat assembly including a base with two connector arms which are movable back and forth to extend from and retract into the base. An adjustment mechanism includes a manually operable release actuating assembly disposed between the two connector arms and two latches arranged to lock or unlock the connector arms to the base. The child safety seat assembly is further described to include a driving mechanism operable to actuate the latching hook of a locking fastener provided on each connector arm in order to engage or disengage the anchorage bracket of the vehicle. The driving mechanism includes a manually operable fastener release actuator operatively connected with a linking bar, which in turn is connected with the latching hook.

WO 2012/172001 A1 relates to a base, to which a child safety seat can be releasably connected. The base comprises a floor support device, Isofix connectors and a support surface for the child safety seat. The base further comprises a fastening and adjustment mechanism for the child safety seat and the Isofix connectors. The fastening and adjustment mechanism comprises a first handle that is connected to and cooperating with at least one hook and an indicator device and a second handle being connected to a locking device.

In many of the hitherto known mounting systems the adjustment mechanism is separate from the connectors, often arranged between the connectors, and takes up a great deal of space. Moreover, the mounting system is generally integrated in a chassis on which the child safety seat is placed. There is a need for a more user-friendly and convenient system in order to facilitate and ensure safe mounting of portable child safety seats in vehicles.

WO 2016/066802 A1 relates to an adjustable connecting bar enabling mounting of a child safety seat to fixedly secured anchoring members of a vehicle seat by means of a coupling device provided at an end of the connecting bar. The connecting bar comprises first and second elongated bar members telescopically interconnected and arranged for relative displacement via one or more intermediate positions between a retracted end position and an extended end position of the connecting bar. The connecting bar comprises a first latch operatively connected with the coupling device and arranged to lock the connecting bar in said extended end position and to prevent retraction of the connecting bar when the coupling device is in release configuration. The first latch is further arranged to allow retraction of the connecting bar when the coupling device is in locked configuration. The connecting bar further comprises a second latch functionally controlled by the relative displacement of the first and second elongated bar members. This adjustable connecting bar enables safe and secure mounting of a child safety seat in a vehicle seat when handled properly. However, in order to avoid any potential risk for misuse thereof, it would be desirable to block transformation of the coupling device to the locked configuration when extension of the connecting bar is allowed.

SUMMARY OF THE INVENTION

An object of the present invention is to alleviate one or more of the above problems and to provide an improved, user-friendly and convenient adjustable connecting bar for releasable fastening of a child restraint system, herein also referred to as a child safety seat, to a vehicle seat having mounted anchoring members.

According to a first aspect of the present disclosure, there is provided an adjustable connecting bar for releasable fastening of a child restraint system to a vehicle seat provided with a mounted anchoring member. The connecting bar may be rigidly coupled to, or integrated in, the child restraint system. The child restraint system is normally provided with two connecting bars arranged to be coupled to a pair of corresponding anchoring members mounted in the vehicle seat.

The connecting bar comprises a first elongated bar member and a second elongated bar which are telescopically interconnected and arranged for relative displacement along a longitudinal axis, preferably via one or more intermediate positions, between a retracted end position and an extended end position of the connecting bar.

The retracted end position of the connecting bar may also be referred to as storage position. The extended end position and any intermediate end position may also be referred to as ready-to-use or use position.

The first elongated bar member is provided with a coupling device at an end thereof. The end of the first elongated bar member being provided with the coupling device corresponds to the end of the connecting bar proximal to the coupling device. Thus, the first elongated bar member extends along the longitudinal axis between a first proximal end provided with the coupling device and a first distal end. The second elongated bar member extends along the longitudinal axis between a second proximal end and a second distal end.

The coupling device comprises a movable coupling member, such as a movable hook member, in particular a pivotal hook member, for engaging the anchoring member and the coupling device is transformable between a locked configuration and a release configuration. The coupling device comprises a displaceable latch member biased, such as by means of a spring, to engagement with the movable coupling member to latch the movable coupling member in the locked configuration. The displaceable latch member may be arranged to be displaceable via a linear motion along the longitudinal axis of the connecting bar. The coupling device is transformable from said locked configuration to said release configuration in a first operation step by means of a manually operable actuator. The manually operable actuator is operatively connected via a maneuvering system with the displaceable latch member for selectively disengaging the displaceable latch member from the movable coupling member.

The connecting bar further comprises a latch system housed within the connecting bar, more particularly housed within the first elongated bar member, for selectively preventing extension and retraction of the connecting bar. The latch system comprises a first latch and a second latch.

The first latch is operatively connected via the maneuvering system to the displaceable latch member. The first latch is arranged to lock the connecting bar in the extended end position and to prevent retraction of the connecting bar when the connecting bar is in the extended end position and the coupling device is in the release configuration. Furthermore, the first latch is arranged to allow retraction of the connecting bar when the coupling device is in the locked configuration. The first latch will in the extended end position of the connecting bar prevent retraction of the connecting bar until the coupling device, upon installation of the child safety seat in a vehicle, is engaged with an anchoring member mounted in the vehicle and transformed to the locked configuration. Thus, the first latch functions as an installation lock for the connecting bar when in the extended end position. This arrangement reduces the risk for misuse of the connecting bar.

The second latch is arranged to be transferrable from an active state to an inactive state. In the active state, the second latch is arranged to prevent extension and to allow retraction of the connecting bar. In said inactive state, the second latch is arranged to allow both extension and retraction of said connecting bar. Moreover, the second latch is biased to the active state and transferrable from the active state to the inactive state in a second operation step by means of the manually operable actuator. The second operation step is separate from the first operation step and only allowed when the coupling device is in the release configuration. The second latch is arranged to return to the active state upon release of the manually operable actuator.

Due to the fact that the second latch is only allowed to be transferred to the inactive state by means of the manually operable actuator and that this second operation step only is allowed following the first operation step transforming the coupling device to the release configuration, i.e. unlocking of the coupling device, the second latch will stop the connecting bar from reaching the extended end position unless the manually operable actuator is operated, such as by pressing down a button or by maneuvering a lever, until the connecting bar is fully extended. Thus, the second latch will be in the inactive state as long as the manually operable actuator is operated, such as long as the button is pressed down or the lever is held in a certain position. When the manually operated actuator is released, the second latch will return to the active state. The fact that the second latch is active in all positions, even the storage position, unless the manually operable actuator is operated, is advantageous from a safety perspective if for instance the storage position, i.e. the retracted end position, is reached during a crash. The second latch will in such situation prevent the connecting bar from extending.

Moreover, a single manually operable actuator for both the unlocking operation and the extension operation is advantageous from a user perspective.

The maneuvering system of the connecting bar may be housed within the first elongated bar member. The maneuvering system may comprise a wire connected to the manually operable actuator, a first displaceable maneuvering element arranged to be responsive to movement of the wire and displaceable therewith, the first displaceable maneuvering element being biased to a first position proximal to the coupling device, a second displaceable maneuvering element arranged to be responsive to movement of the displaceable latch member and displaceable therewith, and a displaceable lock element arranged to be responsive to movement of the second displaceable maneuvering element and displaceable therewith.

The displaceable lock element may be arranged to block movement of the first latch and thereby lock the first latch when the coupling device is in the release configuration and the connecting bar is in said extended end position.

Operation of the manually operable actuator pulls the wire along the longitudinal axis in a direction away from the coupling device.

The first displaceable maneuvering element may be connected to the wire. For instance, the wire may comprise at an end thereof an anchoring element, such as a spherical element configured to be arranged in a recess of the first displaceable maneuvering element such that it is kept in place and thus provides a connection between the wire and the first displaceable maneuvering element. In particular, the end of the wire comprising the spherical element is proximal to the coupling device.

The second displaceable maneuvering element may be connected to the displaceable latch member. For instance, the displaceable latch member may comprise at an end thereof a pin configured to be arranged in a recess of the second displaceable maneuvering element such that it is kept in place and thus provides a connection between the displaceable latch member and the second displaceable maneuvering element. In particular, the end of the displaceable latch member comprising the pin is distal to the coupling device.

The displaceable lock element may be connected to the second displaceable maneuvering element. For instance, the displaceable lock element may be connected via a rod to the second displaceable maneuvering element, the rod extending along the longitudinal axis of the connecting bar.

The wire may be a single wire or two or more wires running side by side and bonded, twisted, or braided together to form a single assembly, also referred to as cable.

The wire may be a so-called Bowden cable, which comprises an inner wire or cable arranged in a hollow outer cable sheath.

In a connecting bar comprising the above disclosed maneuvering system, the first operation step allow displacement of the first displaceable maneuvering element against the bias thereof along the longitudinal axis to a second position distal to the coupling device. When displaced, the first displaceable maneuvering element thereby pushes the second displaceable maneuvering element from a first position distal to the coupling device along the longitudinal axis to a second position proximal to the coupling device. Displacement of the second displaceable maneuvering element is arranged to allow displacement of the displaceable latch member, which thereby disengages from the movable coupling member such that the coupling device is transformed to the release configuration. The first displaceable maneuvering element is biased back in a direction along the longitudinal axis towards the coupling device upon release of the manually operable actuator.

In a connecting bar comprising the above disclosed maneuvering system, the second operation step allows displacement of the first displaceable maneuvering element against the bias thereof along the longitudinal axis towards engagement with a first end of a displaceable arm, the displaceable arm thereby being displaced to an operative position where a second end of the arm forces the second latch against the bias thereof to the inactive state.

The second displaceable maneuvering element may be configured to prevent engagement between the displaceable arm and the first displaceable maneuvering element when the coupling device is in the locked configuration as further disclosed hereinafter.

In the adjustable connecting bar as disclosed herein, the displaceable latch member is biased to engagement with the movable coupling member to latch the movable coupling member in the locked configuration. Thus, transformation of the coupling device from the release configuration to the locked configuration allows the displaceable latch member to engage the movable coupling member and the displaceable latch member thereby displaces along the longitudinal axis towards the coupling device. This displacement of the displaceable latch member is arranged to allow displacement of the second displaceable maneuvering element along the longitudinal axis towards the coupling device, and the displacement of the second displaceable maneuvering element is arranged to allow displacement of the displaceable lock element such that the first latch is unlocked. When the first latch is unlocked, as a consequence of the coupling device being transferred from the release configuration to the locked configuration, the first latch allows retraction of the connecting bar.

The adjustable connecting bar as disclosed herein may further comprise a displaceable block element arranged to be responsive to movement of the wire, in the direction away from the coupling device, and reversibly displaceable therewith along the longitudinal axis in a direction towards the coupling device, the displaceable block element being biased away from the coupling device. Displacement of the displaceable block element in the direction towards the coupling device may be arranged to allow displacement of the displaceable lock element along therewith when the connecting bar is in the extended end position and the coupling device is in the release configuration such that the first latch is unlocked.

The adjustable connecting bar as disclosed herein may further comprise a biasing member arranged to bias the first elongated bar member away from the second elongated bar member. The second latch may be housed within the first elongated bar member. The second latch may be configured with a first locking member at an end thereof, the first locking member being capable of engaging a second locking member housed within the second elongated bar member when the connecting bar is in the retracted end position. When the first locking member is in engagement with the second locking member, the first elongated bar member is held against the bias of the biasing member and the connecting bar is kept in the retracted end position. In particular, the second operation step of the manually operable actuator may allow the first locking member to disengage from the second locking member thereby ejecting the first elongated bar member and extending the connecting bar to the extended end position.

Thus, when the child safety seat is not in use, the connecting bars may be stowed and at least partly enclosed in the child safety seat in order to facilitate handling and transportation of the portable child safety seat. When the child safety seat is to be mounted to a vehicle seat, the first elongated bar member of each connecting bar may be ejected to the extended end position by means of the manually operable actuator.

When the herein disclosed connecting bar has reached the extended end position and the coupling device is in the release configuration, i.e. the open configuration, retraction of the connecting bar is prevented by the installation lock, i.e. the first latch. It is then easy to connect the coupling device provided at an end of the extended connecting bar to a mounted anchoring member of a vehicle seat. Once the coupling device has been connected to the anchoring member and thereby transformed to the locked configuration, i.e. the closed configuration, the installation lock, which is operatively connected via the maneuvering system with the coupling device, is released and retraction of the connecting bar is allowed. This means that once the coupling devices of the connecting bars have been fastened to the anchoring members of a vehicle seat, the length of the connecting bars can be adjusted by pushing the child safety seat as far as possible against the backrest of the vehicle seat. During this adjustment operation and during use of the child safety seat, the second latch is arranged to prevent extension of the connecting bar.

It is advantageous from a safety aspect that adjustment of the length by which the connecting bars protrude from the child safety seat only can be performed once the child safety seat has been fastened to the anchoring members of the vehicle seat; that is once the coupling device has been transformed to the locked configuration.

Moreover, since the first latch of the connecting bar is operatively connected via the maneuvering system with the coupling device and thereby functionally controlled by the different configurations of the coupling device, i.e. the open and the closed configuration, no manual operation is required in order to enable adjustment of the length by which the connecting bar(s) protrude from the child safety seat.

When the child safety seat is to be removed from the vehicle seat, the coupling device is transformed to the release configuration in the first operation step by means of the manually operable actuator.

Thereafter, the connecting bar may be retracted to the retracted end position, where the first locking member will engage the second locking member and hold the connecting bar in the retracted end position.

In the adjustable connecting bar as disclosed herein, the second elongated bar member may be arranged to at least party encase a part of the first elongated bar member.

The first elongated bar member may be provided along the longitudinal axis with a first aperture proximal to the coupling device and a second aperture distal to the coupling device, where each of the first and second apertures is arranged to extend along a respective center line parallel to the longitudinal axis, the center lines of the first and second apertures being non-coinciding.

The second elongated bar member may be provided along the longitudinal axis with a series of apertures, where the series of apertures is arranged to overlap the second aperture of the first elongated bar member. The first latch is then biased to engage the first aperture of the first elongated bar member, and the second latch is biased to engage the second aperture of the first elongated bar member and any overlapping aperture of the series of apertures of the second elongated bar member.

According to a second aspect of the present disclosure, there is provided an adjustable mounting arrangement for releasable fastening of a child safety seat to a vehicle seat having mounted anchoring members, wherein the arrangement comprises a pair of adjustable connecting bars as disclosed herein.

According to a third aspect of the present disclosure, there is provided a child restraint system arranged for releasable fastening to a vehicle seat, wherein the child restraint system comprises an adjustable mounting arrangement as disclosed herein.

The above configuration of the adjustable connecting bar enables convenient and user-friendly mounting of a child safety seat to a vehicle seat. A mounting arrangement containing two connecting bars as described herein can be easily coupled to corresponding mounted anchoring members of a vehicle seat, and the length of the connecting bars protruding from the child safety seat can be adjusted in a semi-automatic manner. The adjustable connecting bar enables safe and secure mounting of a child safety seat in a vehicle seat.

In addition, the herein-described adjustable mounting arrangement is space-saving since the adjustment mechanism is integrated with, more specifically provided within, the connecting bar. The connecting bars can be fixedly coupled to and integrated with the child safety seat, thereby obviating the need for a separate chassis containing the connecting bars and the adjustment mechanism.

Other features and advantages of the present invention will become apparent from the following description of the invention.

BRIEF DESCRIPTION OF THE DRAWINGS

FIG. 2 illustrates a type of coupling device which may be used in the connecting bar as disclosed herein. FIG. 2 also illustrates a maneuvering device which may be used in the connecting bar as disclosed herein.

FIGS. 3 and 4a-4d show the elements of the embodiment of FIG. 1 in more detail. FIGS. 4a and 4b illustrate the adjustable connecting bar in storage position, i.e. retracted end position. The coupling device is in release configuration. FIGS. 4c and 4d illustrate the second operation step by means of the manually operable actuator where the connecting bar is ejected to the extended end position and the installation lock is actuated.

FIG. 6 illustrates the adjustable connecting bar in use position, i.e. extended end position with installation lock released. The coupling device is in locked configuration.

FIG. 7 illustrates the adjustable connecting bar in use position where the length of the bar has been adjusted, i.e. an intermediate position. The coupling device is in locked configuration.

FIG. 8a illustrates some components of the adjustable connecting bar when the first operation step is actuated by means of the manually operable actuator. The coupling device thereby transformed from the locked configuration to the release configuration. FIG. 8b illustrates some components of the adjustable connecting bar when the coupling device is in the release configuration.

DETAILED DESCRIPTION

Figure 1:
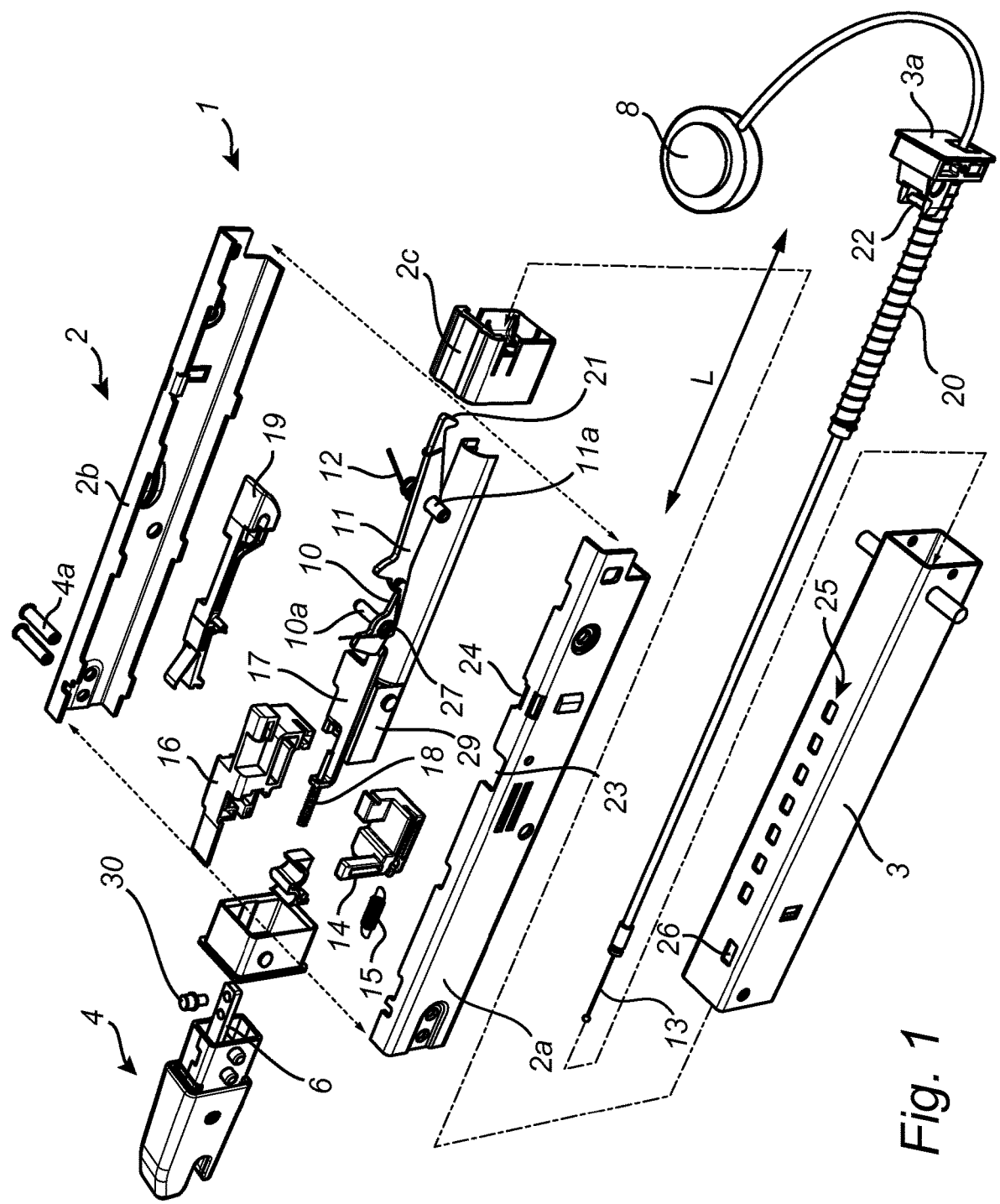
FIG. 1 is an exploded view of an embodiment of an adjustable connecting bar as disclosed herein.

The invention will now be exemplified by means of the following non-limiting embodiments. In the drawings, like reference numerals identify similar or identical elements. The drawings are schematic and illustrative; shown dimensions thereof are thus not exact.

The same embodiment of the connecting bar as disclosed herein is illustrated FIGS. 1-10. However, it may be noted that all reference numbers are not included in all figures.

Figure 4A:
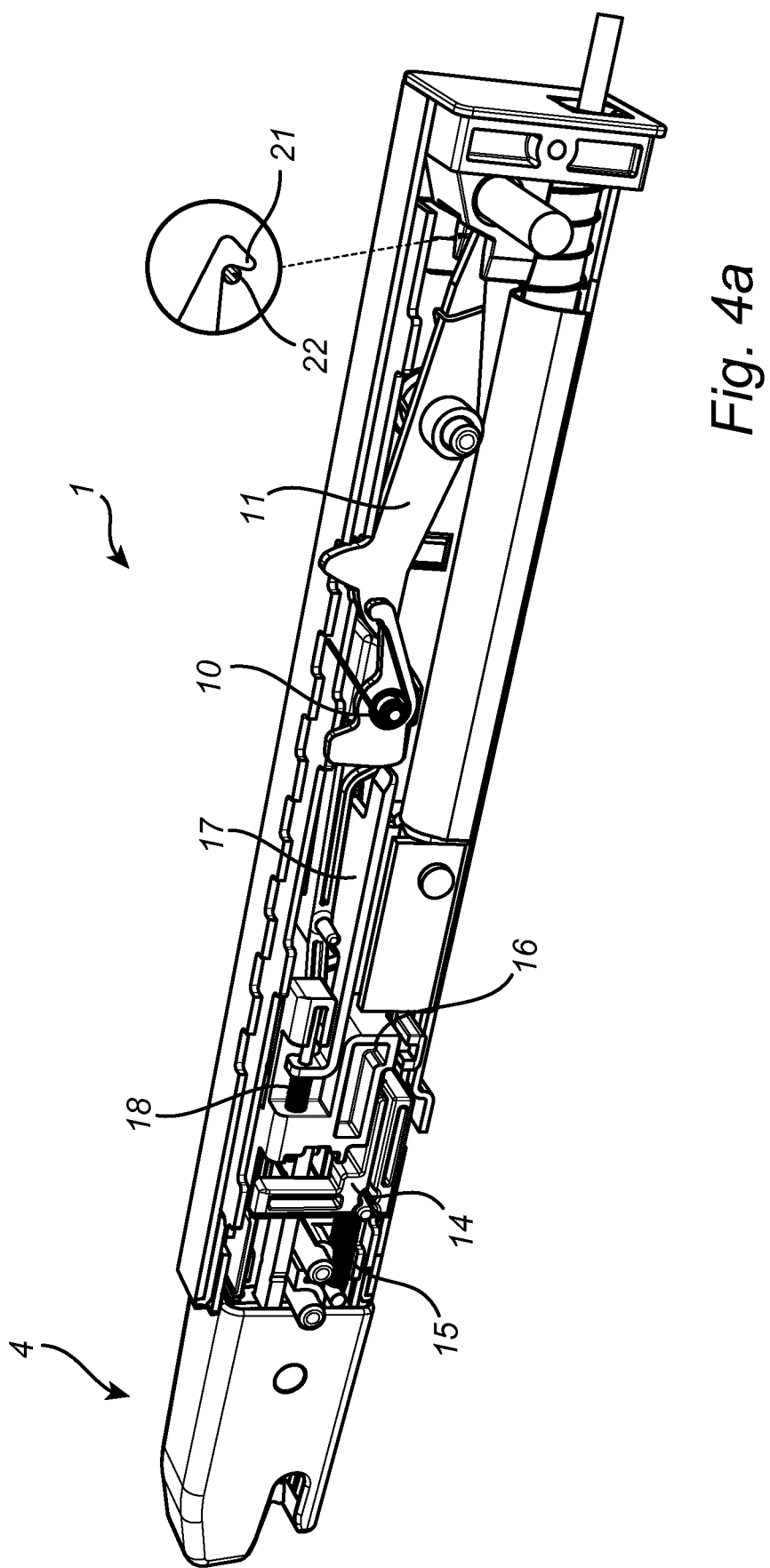
Figure 4B:
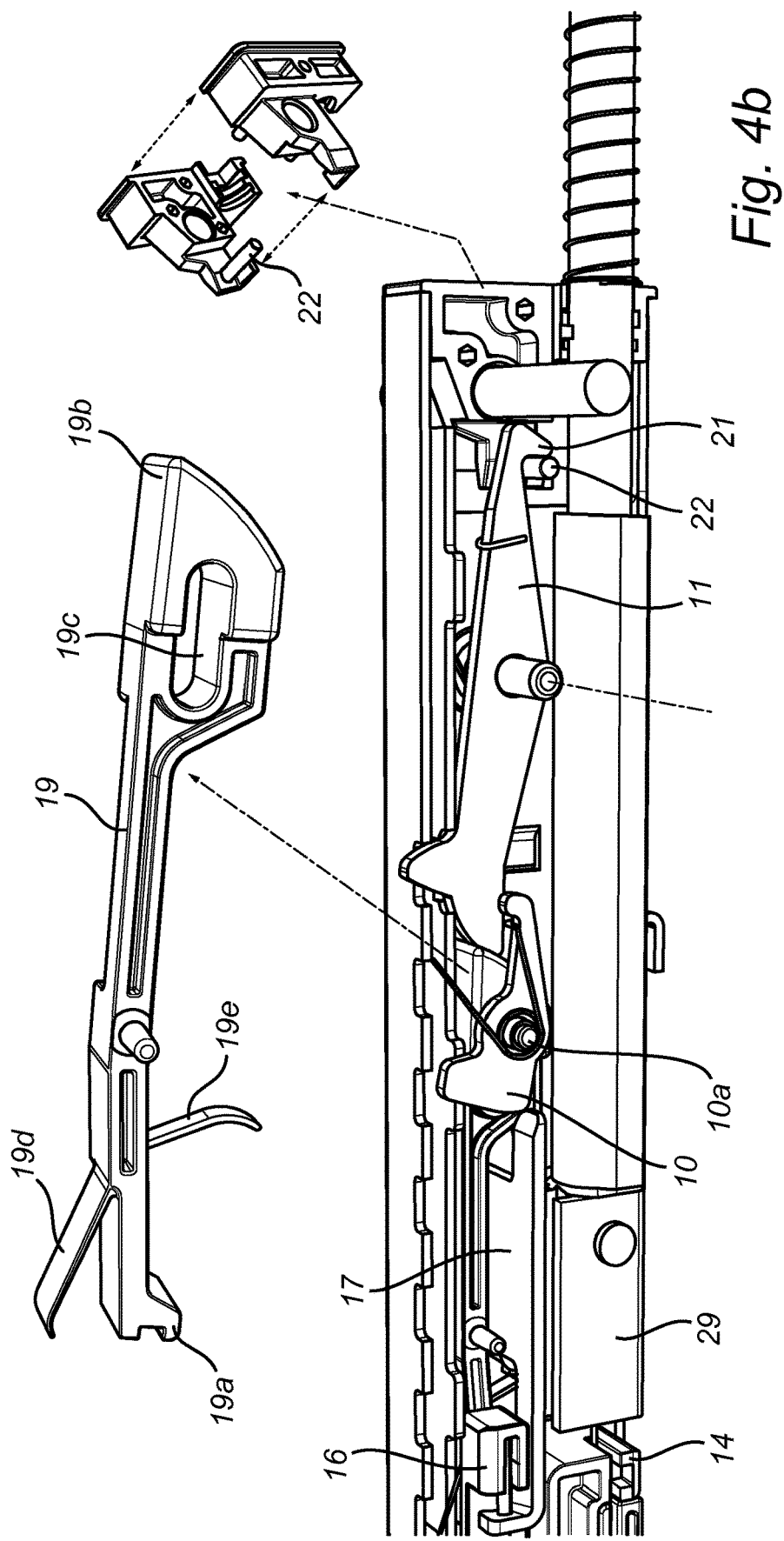
Figure 4C:
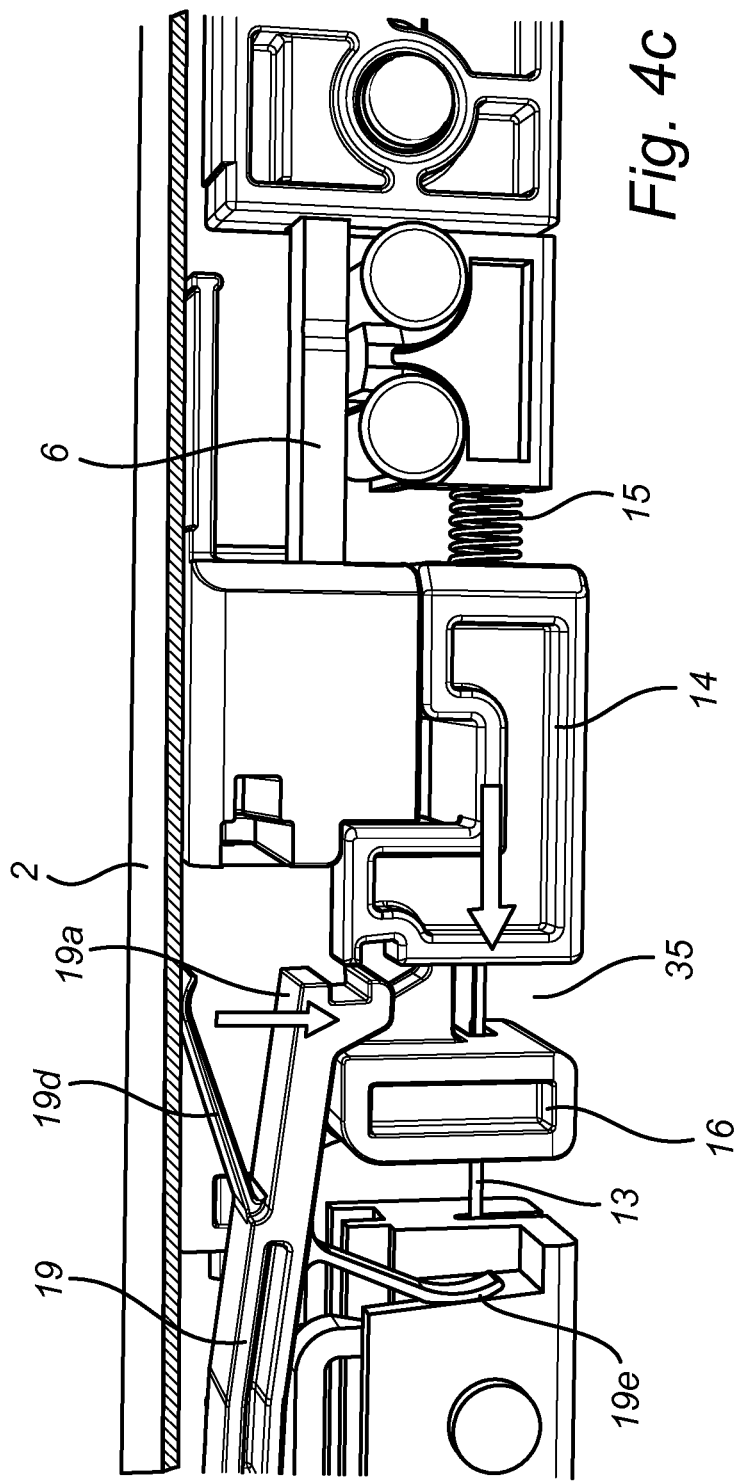
Figure 8C:
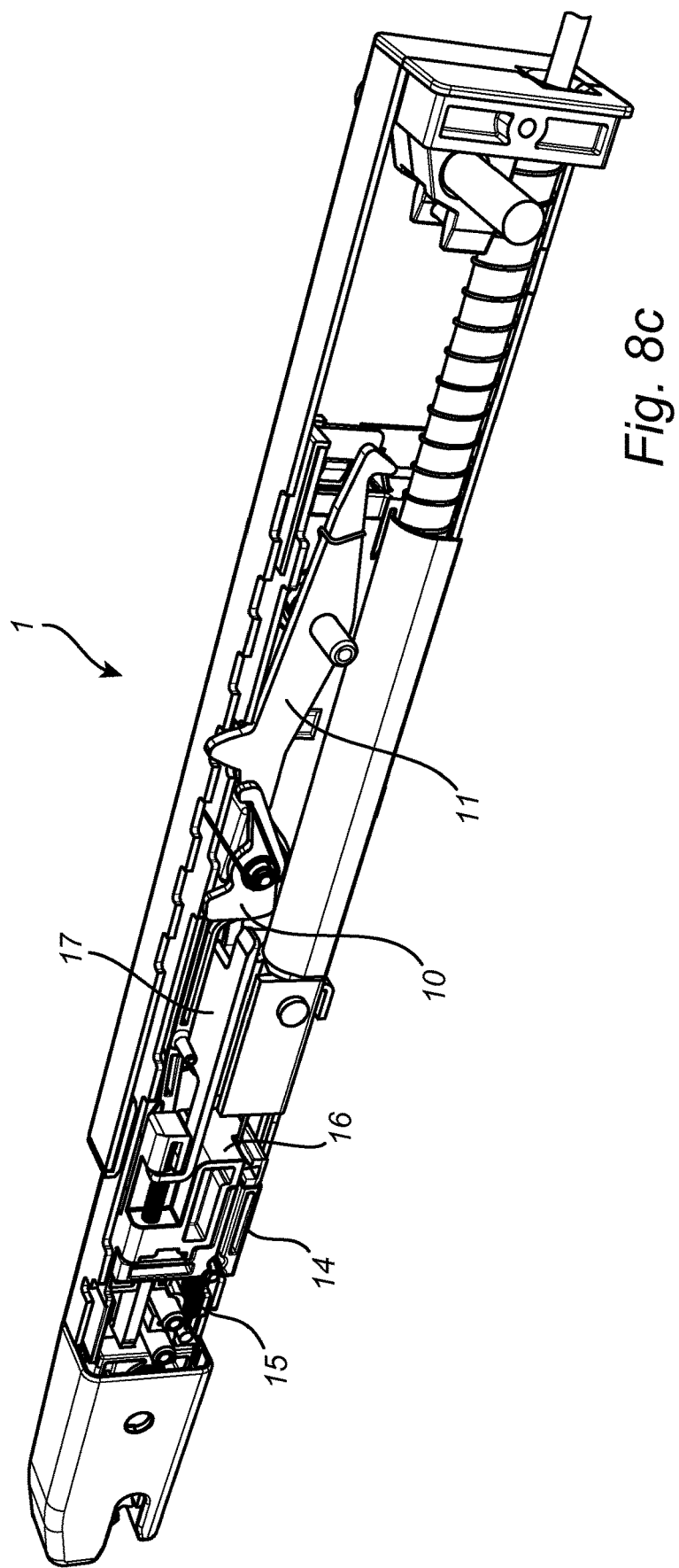
FIG. 8c illustrates the adjustable connecting bar in an intermediate position having the coupling device in the release configuration.

It should also be noted that in FIGS. 1-3, 4a, 4b, 5-7, 8b and 8c the coupling device is to the left in the drawing whereas in FIGS. 4c, 4d and 8a the connecting bar is seen from the other side and the coupling device is therefore to the right in the drawing.

As used herein, the terms "proximal" and "distal" are used in relation to each other. The term "proximal", when used in connection with the adjustable connecting bar and elements thereof, refers to any part of the connecting bar closer to the coupling device, whereas the term "distal" refers to any part of the connecting bar farther away from the coupling device.

As used herein, the term "operatively connected to", when used in connection with elements of the connecting bar, refers to that the elements are functionally connected. The elements may be directly connected to each other or connected via one or more other elements.

As used herein, the term "manually operable" means operable by a user, such as by hand.

FIG. 1 is an exploded view of an embodiment of an adjustable connecting bar 1 for releasable fastening of a child restraint system to a vehicle seat provided with a mounted anchoring member.

The connecting bar 1 comprises a first elongated bar member 2 and a second elongated bar member 3 which are telescopically interconnected and arranged for relative displacement along a longitudinal axis L via one or more intermediate positions between a retracted end position and an extended end position of the connecting bar 1.

The first elongated bar member 2 is provided with a coupling device 4, such as an Isofix connector, at an end thereof. The first elongated bar member 2 extend along the longitudinal axis L between a first end proximal to the coupling device 4 and a second end distal to the coupling device 4. As shown in FIG. 1, the first elongated bar member 2 may comprise two interconnected sections 2a, 2b substantially forming longitudinal halves of the first elongated bar member 2. The coupling device 4 may be attached to the proximal end of the first elongated bar member 2 by one or more pins, such as rivets 4a. The distal end of the first elongated bar member 2 comprises a sleeve 2c attached thereto.

The second elongated bar member 3 also extends along the longitudinal axis L between a first end proximal to coupling device 4 and a second end distal to the coupling device 4. The distal end of the second elongated bar member 3 comprises an end cap 3a attached thereto.

In the adjustable connecting bar 1 as disclosed herein, the second elongated bar member 3 may be arranged to at least party encase a part of the first elongated bar member 2.

FIG. 2 illustrates a type of coupling device 4 which may be used in the connecting bar 1 as disclosed herein. FIG. 2 also illustrates the components of the maneuvering device 9 as further described hereinafter with reference to FIG. 3.

The coupling device 4 comprises, as shown in FIG. 2, a movable coupling member, in this case a biased pivotal hook member 5, for engaging an anchoring member, such as an Isofix anchoring member (not shown), of a vehicle seat and the coupling device 4 is transformable between a locked configuration, as illustrated in FIG. 2, and a release configuration. The coupling device 4 comprises a displaceable latch member 6 biased, such as by means of a spring 7, to engagement with the pivotal hook member 5 to latch the pivotal hook member 5 in the locked configuration. It should be noted that FIG. 2 illustrates the positions of the first and second displaceable elements 14, 16, which are further described hereinafter, when the wire 13 is pulled by means of operation of the manually operable actuator 8. Thus, the coupling device 4 is still in the locked configuration, but on its way to be transferred to the release configuration by means of operation of the manually operable actuator 8, see FIG. 1.

The coupling device 4 is, as well-known within the art, transformable from the release configuration, i.e. open configuration, to the locked configuration, i.e. closed configuration, shown in FIG. 2, by means of introducing a rod-like member (not shown), such as a fixedly mounted Isofix anchoring member, into the "mouth" of the coupling device 4.

It should be noted that even though the connecting bar as disclosed herein is exemplified with the type of coupling device illustrated in FIG. 2, the connecting bar of the present disclosure is not restricted to include this type of coupling device. As known within the art, there exist several other known types of coupling devices transformable between a release configuration and a locked configuration when engaging an anchoring member of a vehicle seat, which instead may be included in the connecting bar as disclosed herein.

The coupling device 4 is transformable from the locked configuration to the release configuration in a first operation step by means of a manually operable actuator 8, see FIG. 1. The manually operable actuator 8 is operatively connected via a maneuvering system 9, see FIG. 3, to the displaceable latch member 6 for selectively disengaging the displaceable latch member 6 from the pivotal hook member 5. The maneuvering system 9 is described in more detail hereinafter.

As illustrated in FIG. 1, the connecting bar 1 further comprises a latch system 10,11 housed within the first elongated bar member 2 for selectively preventing extension and retraction of the connecting bar. The latch system comprises a first latch 10 and a second latch 11.

The first latch 10 and the second latch 11 are housed within the first elongated bar member 2.

The first latch 10 is operatively connected via the maneuvering system 9, see FIG. 3, to the displaceable latch member 6. The first latch 10 is arranged to lock the connecting bar 1 in the extended end position and to prevent retraction of the connecting bar 1 when the connecting bar 1 is in the extended end position and the coupling device 4 is in the release configuration, thereby functioning as an installation lock.

The first latch 10 may, as shown in FIG. 1, be pivotally arranged around a first axis extending transversely to the longitudinal axis L of the connecting bar 1. The first latch 10 may be secured to the first elongated bar member 2 by a pin 10a, such as a rivet, the first axis extending along the pin 10a. The first latch 10 is biased by spring 27 as further described hereinafter.

The second latch 11 is biased by spring 12 to an active state and transferrable from the active state to the inactive state in a second operation step by means of the manually operable actuator 8. The second latch 11 is arranged to return to the active state due to the bias of spring 12 upon release of the manually operable actuator 8.

The second latch 11 may, as shown in FIG. 1, also be pivotally arranged around a second axis extending transversely to the longitudinal axis L of the connecting bar 1. The second latch 11 may be secured to the first elongated bar member 2 by a pin 11a, such as a rivet, the second axis extending along the pin 11a.

The second latch 11 is, as shown in FIG. 1, arranged farther from the coupling device 4 than the first latch 10. Thus, the first latch 10 may alternatively be referred to as a proximal latch and the second latch 11 may alternatively be referred to as a distal latch in relation to the coupling device 4.

The adjustable connecting bar 1 further comprises a biasing member arranged to bias the first elongated bar member 2 away from the second elongated bar member 3. In particular, the biasing member is attached to the end cap 3a and arranged to push on the sleeve 2c attached to the distal end of the first elongated bar member 1.

The second latch 11 may be configured with a first locking member 21 at an end thereof. In the embodiment shown in FIG. 1, the first locking member 21 is configured as a hook. The hook-shaped first locking member 21 is capable of engaging a second locking member 22, configured as a pin in the herein disclosed embodiment, when the connecting bar 1 is in the retracted end position, see FIG. 4a. The second locking member 22 is housed within the second elongated bar member 3. In the illustrated embodiment, the second locking member 22 is integral with the end cap 3a.

When the first locking member 21 is in engagement with the second locking member 22, the first elongated bar member 2 is held against the bias of the biasing member and the connecting bar 1 is kept in the retracted end position. In the second operation step of the manually operable actuator, as further described hereinafter, the first locking member 21 will disengage from the second locking member 22 when the second latch 11 is forced to the inactive state by the displaceable arm 19, see FIGS. 4a and 4b, thereby ejecting the first elongated bar member 2 and extending the connecting bar 1 to the extended end position.

The first elongated bar member 2 has an upper wall provided along the longitudinal axis with a first aperture 23 proximal to the coupling device 4 and a second aperture 24 distal to the coupling device 4, where each of the first and second apertures 23, 24 is arranged to extend along a respective center line parallel to the longitudinal axis L, the center lines of the first and second apertures 23, 24 being non-coinciding.

The second elongated bar member 3 may have an upper wall provided along the longitudinal axis with a series of apertures 25, where the series of apertures is arranged to overlap the second aperture 24 of the first elongated bar member 2. The series of apertures provides a plurality of selectable intermediate positions between the retracted end position and the extended end position of the connecting bar 1.

In the illustrated embodiment of the connecting bar 1, there is also an additional aperture 26 provided on the upper wall of the second elongated bar member 3. The additional aperture 26 has a center line parallel to the longitudinal axis which is non-coinciding with the center line of the series of apertures. This additional aperture 26 is arranged to overlap the first aperture 23 of the first elongated bar member 2 when the adjustable connecting bar 1 is in the extended end position. In an alternative embodiment, the second elongated bar member 3 may be arranged not to cover the first aperture 23 when the connecting bar 1 is in the extended end position. In such case, the additional aperture 26 is not required.

The first latch 10 is biased by spring 27 to engage the first aperture 23 of the first elongated bar member 2. The first aperture 23 of the first elongated bar member 2 is covered by the encasing upper wall of the second elongated bar member 3 in the retracted end position and in any intermediate positions of the connecting bar 1. The encasing upper wall of the second elongated bar member 3 will in these positions push down the first latch 10. When the adjustable connecting bar 1 is in the extended end position, the first latch is allowed to protrude through the first aperture 23 and the overlapping aperture 26.

The second latch 11 is biased by spring 12 to engage the second aperture 24 of the first elongated bar member 2 and any overlapping aperture of the series of apertures of the second elongated bar member 3.

The first latch 10 is configured to include a protruding top part (see FIGS. 4a and 4b). Upon retraction of the connecting bar 1 from the extended end position, the upper wall of the second elongated bar member 3 will push on the protruding top part of the first latch 10 which thereby is moved downwards into the first elongated bar member 2.

The second latch 11 is also configured to include a protruding top part (see FIGS. 4a and 4b). Upon retraction of connecting bar 1 while in an intermediate position, the upper wall of the second elongated bar member 3 will push on the protruding top part of the second latch 11 which is thereby moved downwards into the first elongated bar member 2.

The maneuvering system 9 of the connecting bar 1 is housed within the first elongated bar member 2, see FIGS. 1 and 3. The maneuvering system 9 comprises a wire 13, a first displaceable maneuvering element 14, a second displaceable maneuvering element 16 and a displaceable lock element 17.

The wire 13 is connected to the manually operable actuator 8 which is arranged exterior to the elongated bar members 2 and 3.

The first displaceable maneuvering element 14 is connected to the wire 13 and is arranged to be displaceable therewith. The first displaceable maneuvering element 14 is biased by spring 15, see FIG. 2, towards the coupling device 4.

The wire 13 comprises at an end proximal to the coupling device an anchoring element, in this embodiment a spherical element 31 configured to be arranged in a first recess 32 of the first displaceable maneuvering element 14 such that it is kept in place and thus provides a connection between the wire 13 and the first displaceable maneuvering element 14. The wire 13 may be connected to the first displaceable maneuvering element 14 in any alternative way as long as the first displaceable maneuvering element 14 is arranged to be responsive to the movement of the wire 13 and displaceable therewith.

The second displaceable maneuvering element 16 is connected to the displaceable latch member 6 and is arranged to be displaceable therewith. The displaceable latch member 6 comprises, at an end distal to the coupling device 4, a pin 30 configured to be arranged and moveable in a second recess 33 of the second displaceable maneuvering element 16 such that it provides a connection between the displaceable latch member 6 and the second displaceable maneuvering element 16, see FIG. 3.

The displaceable lock element 17 is connected to the second displaceable maneuvering element 16 and is arranged to be displaceable therewith. The displaceable lock element 17 is connected via a rod 34 to the second displaceable maneuvering element 16. The rod 34 extends along the longitudinal axis L of the connecting bar 1.

The displaceable lock element 17 is biased by spring 18 towards the first latch 10, i.e. in a direction away from the coupling device 4. When the coupling device 4 is in the release configuration and the connecting bar 1 is in the extended end position, the displaceable lock element 17 will be in its most distal position in relation to the coupling device 4. The displaceable lock element 17 is then in a position where it blocks and thereby locks the first latch 10. As shown in FIG. 3, the displaceable lock element 17 then blocks any downward movement of the first latch 10. Thus, the displaceable lock element 17 maintains the first latch 10 in a raised position in engagement with aperture 23 and overlapping aperture 26.

When the coupling device 4 is in the locked configuration, a first operation of the manually operable actuator 8 pulls the wire 13 along the longitudinal axis in a direction away from the coupling device 4. Thus, operation of the manually operable actuator 8 induces a linear motion of the wire 13 along the longitudinal axis L in a direction away from the coupling device 4. The first displaceable maneuvering element 14 is then displaced against the bias of the spring along the longitudinal axis L in the same direction away from the coupling device 4. The first displaceable maneuvering element 14 thereby pushes the second displaceable maneuvering element 16 in the same direction away from the coupling device 4.

This displacement of the second displaceable maneuvering element 16 is arranged to in turn allow displacement of the displaceable latch member 6 in the same direction away from the locked coupling device 4. The displaceable latch member 6 thereby disengages from the pivotal hook member 5 such that the coupling device 4 is transformed to the release configuration. The first displaceable maneuvering element 14 is biased back by the spring towards the coupling device upon release of the manually operable actuator 8. The second displaceable maneuvering element 16 is then also pulled back towards the coupling device 4 by the first displaceable maneuvering element 14 as far it is allowed due to its connection to the displaceable latch member 6 via pin in the second recess 33. The position of the pin of the displaceable latch member 6 in the second recess 33 of the second displaceable maneuvering element 16 restricts the movement of the second displaceable maneuvering element 16 when the coupling device 4 is in the release configuration. Thus, there will be a gap 35, see FIG. 4c, between the first displaceable maneuvering element 14 and the second displaceable maneuvering element 16 when the coupling device 4 has been transferred to the release configuration by means of the first operation step and the manually operable actuator 8 has been released. This is described in further detail hereinafter in relation to FIGS. 4c and 4d.

In FIG. 4a, the connecting bar 1 is in the retracted end position (storage position) and the coupling device 4 is in the release configuration. The first latch 10 is unlocked since the upper wall of the second elongated bar member 3 pushes the first latch 10 downwards into the first elongated bar member 2. In the retracted end position, there is no aperture in the second elongated bar member 3 for the first latch 10 to engage. Since the first latch 10 is pushed downwards, the displaceable lock element 17 cannot reach a position where it locks the first latch 10. Thus, the displaceable lock element 17 is in its most proximal position in relation to the coupling device 4. The second latch 11 is in its active state and prevents extension of the connecting bar 1. The first locking member 21 provided at the end of the second latch 11 is in engagement with the second locking member 22 and thereby locks the connecting bar in the retracted end position.

FIGS. 4b and 4c illustrate the components of the connecting bar 1 of FIG. 4a in more detail. The above-mentioned gap 35 between the first displaceable maneuvering element 14 and the second displaceable maneuvering element 16 is illustrated in FIG. 4c.

FIGS. 4b and 4c illustrate the displaceable arm 19, which has a first end 19a and a second end 19b. The displaceable arm 19 also comprises a first resilient leg 19d and a second resilient leg 19e. The first resilient leg 19d is arranged to allow the first end 19a of the displaceable arm 19 to reach the gap 35 between the first displaceable maneuvering element 14 and the second displaceable maneuvering element 16 when coupling device 4 is in the release configuration. The first end 19a of the displaceable arm 19 is pressed downwards due to the resiliency of the first resilient leg 19d. Alternatively to the resilient legs 19d, 19e, the arm 19 may be spring biased.

A second operation step by means of the manually operable actuator 8 once again pulls the wire 13 along the longitudinal axis in a direction away from the coupling device 4 and once again allows displacement of the first displaceable maneuvering element 14 against the bias thereof along the longitudinal axis L. The second operation step is subsequent to the first operation step transforming the coupling device 4 to the release configuration. Due to the gap 35 between the first displaceable maneuvering element 14 and the second displaceable maneuvering element 16, the first displaceable maneuvering element 14 will be displaced towards engagement with the first end 19a of the displaceable arm 19, see FIG. 4c, which thereby is displaced along the longitudinal axis L to an operative position where the second end 19b of the arm 19 forces the second latch 11 against the bias thereof to the inactive state; see FIG. 4d. The first end 19a of the displaceable arm 19 is arranged proximal to the coupling device 4 and the second end 19b of the displaceable arm 19 is arranged distal to the coupling device 4. An elongated aperture 19c in the displaceable arm 19, through which pin 10a extends, allows the arm 19 to be longitudinally displaceable, along the longitudinal axis L, together with the first displaceable maneuvering element 14 when the first end 19a of the arm 19 is in engagement with the first displaceable maneuvering element 14. Thus, displacement of the first displaceable maneuvering element 14 along the longitudinal axis L in a direction away from the coupling device 4 is arranged to allow, when the coupling device 4 is in release configuration, displacement of the arm 19 in the same direction and as a consequence thereof inactivation of the second latch 11. The described displacement of the arm 19 is only possible when the coupling device 4 is in release configuration.

Thus, the second operation of the manually operable actuator 8 pulls the wire 13 along the longitudinal axis in a direction away from the coupling device 4, thereby allowing displacement of the first displaceable maneuvering element 14 against the bias thereof along the longitudinal axis L towards engagement with the first end 19a of the displaceable arm 19 which is thereby displaced along the longitudinal axis L to an operative position where the second end 19b of the arm 19 forces the second latch 11 against the bias thereof to the inactive state. The first locking member 21 is thereby disengaged from the second locking member 22 and the connecting bar 1 is thereby allowed to be ejected to the extended end position due to the tension of the biasing member 20.

It should be noted that the second operation step is not required to occur immediately after the first operation step. The connecting bar 1 may be kept in the storage position with the coupling device 4 in the release configuration and when the connecting bar 1 is to be used, the second operation step is performed such that the connecting bar 1 is ejected to the installation position, i.e. the extended end position.

Figure 5:
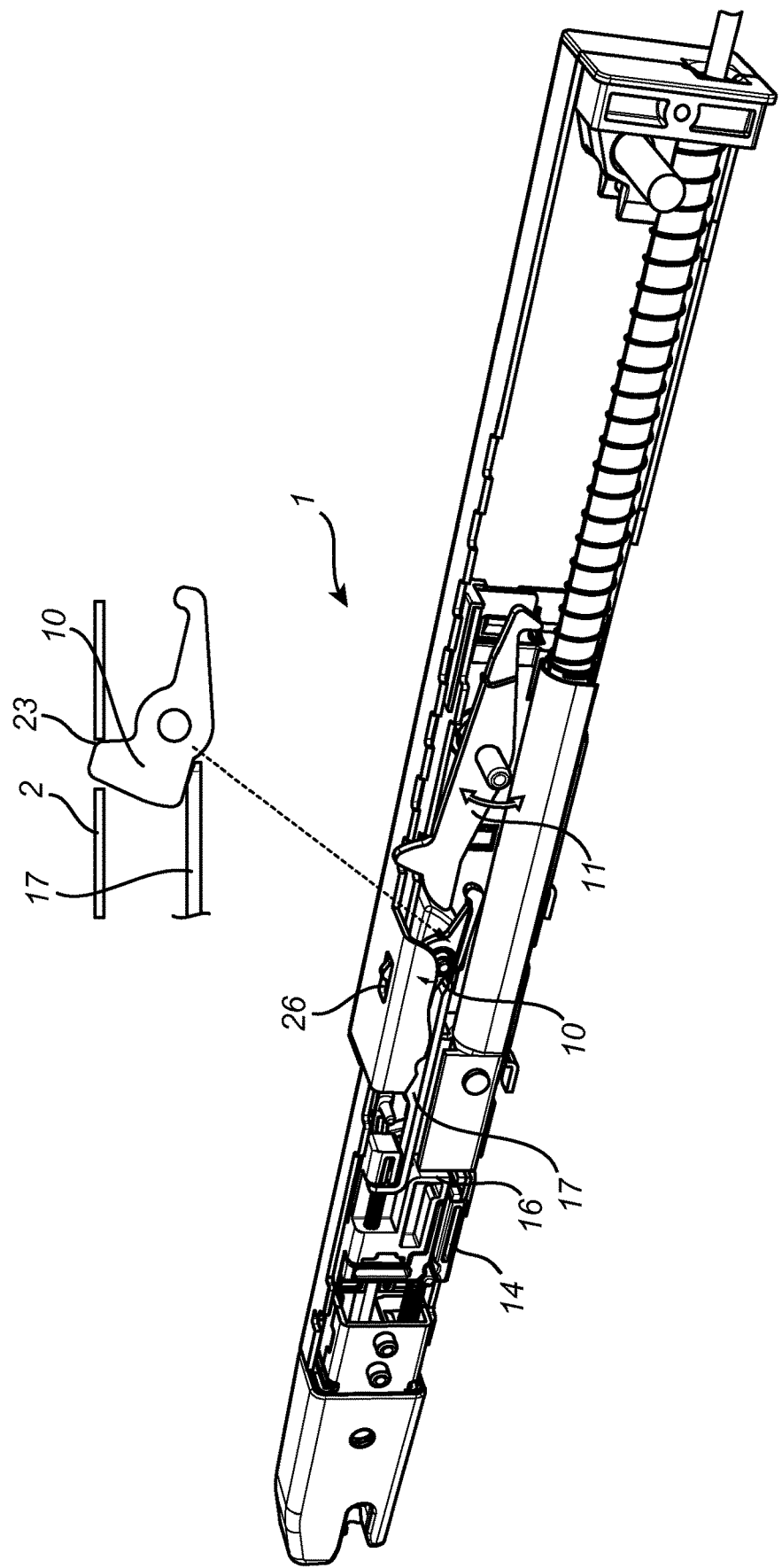
FIG. 5 illustrates the adjustable connecting bar in ready-to-use position, i.e. extended end position with installation lock actuated. The coupling device is in release configuration.

FIG. 5 illustrates the connecting bar in the extended end position with the installation lock actuated. The coupling device 4 is still in the release configuration.

As illustrated in FIG. 5, when the extended end position of the connecting bar 1 has been reached, the first latch 10 is allowed to protrude through the first aperture 23 of the first elongated bar member 2 as well as the overlying additional aperture 26 provided on the upper wall of the second elongated bar member 3. Since the coupling device 4 is still in the release configuration, the displaceable lock element 17 is in its most distal position in relation to the coupling device 4. Thus, the displaceable lock element 17 locks the first latch 10, i.e. the first latch 10 is prevented by the displaceable lock element 17 from disengaging the first aperture 23 and the overlying additional aperture 26. The first latch 10 thereby locks the connecting bar 1 in the extended end position and prevents retraction thereof. As further illustrated in FIG. 5, the second latch 11 is in the active state.

In FIG. 6, the connecting bar 1 is still in the extended end position, but the coupling device 4 has been transformed from the release configuration, as shown in FIG. 5, to the locked configuration by fastening the coupling device 4 to an anchoring member A. By locking the coupling device 4, the biased displaceable latch member 6 is allowed to displace in a direction along the longitudinal axis L towards the end of the connecting bar 1 proximal to the coupling device and into engagement with the pivotal hook member 5. Thus, the displaceable latch member 6 is biased to engagement with the pivotal hook member 5 to latch the pivotal hook member 5 in the locked configuration. The displacement of the displaceable latch member 6 towards the end of the connecting bar 1 proximal to the coupling device is arranged to allow displacement of the second maneuvering element 16 in the same direction along the longitudinal axis L. Also, the first displaceable maneuvering element 14 is displaced along the longitudinal axis L towards the coupling device 4. Displacement of the second displaceable maneuvering element 16 is arranged to allow displacement of the displaceable lock element 17 in the same direction towards the coupling device 4. Displacement of the displaceable lock element 17 to its most proximal position results in the first latch 10 being unlocked. The first latch 10 is then merely spring biased into engagement with the first aperture 23. The first latch 10 is thus movable downwards when the second elongated bar member 2 pushes on the protruding top part of the first latch 10. Thus, when the first latch 10 is unlocked, as a consequence of the coupling device 4 being transferred from the release configuration to the locked configuration, the first latch 10 will no longer prevent retraction of the connecting bar 1 and retraction of the connecting bar 1 is thereby allowed.

In FIG. 7, the length of the connecting bar 1 has been adjusted by retraction of the connecting bar 1 to an intermediate position (use position). The coupling device 4 is still in the locked configuration. The second latch 11 is spring biased into engagement with the second aperture 24 of the first elongated bar member 2 and any overlapping aperture in the row of apertures of the second elongated bar member 3. The second latch 11 thereby prevents extension of the connecting bar 1 but allows retraction thereof. The second latch 11 is thus moveable downwards when the second elongated bar member 3 pushes on the protruding top part of the second latch 11.

FIG. 8a illustrates transformation of the coupling device 4 from the locked configuration shown in FIG. 7 to the release configuration by performing the first operation step by means of the manually operable actuator 8. As described hereinbefore, the wire 13 is pulled along the longitudinal axis in a direction D away from the coupling device 4 by means of the manually operable actuator 8. By pulling the wire 13, the first displaceable maneuvering element 14, which is connected to the wire 13 via the spherical element 31, is displaced against the bias of the spring along the longitudinal axis L in the direction D away from the coupling device 4. The first displaceable maneuvering element 14 thereby pushes the second displaceable maneuvering element 16 in the same direction D as shown in FIG. 8a. The second displaceable maneuvering element 16 prevents engagement between the displaceable arm 19 and the first displaceable maneuvering element 14 when the coupling device 4 is in the locked configuration.

Displacement of the second displaceable maneuvering element 16 is arranged to allow displacement of the displaceable latch member 6 via pin in recess 33. The displaceable latch member 6 thereby disengages from the pivotal hook member 5 such that the coupling device 4 is transformed to the release configuration as shown in FIG. 8b. The first displaceable maneuvering element 14 is biased back by the spring 15 towards the coupling device 4 upon release of the manually operable actuator 8. The second displaceable maneuvering element 16 is also, as described above, pulled back towards the coupling device 4 by the first displaceable maneuvering element 14 as far it is allowed due to its connection to the displaceable latch member 6 via pin in recess 33. FIG. 8b shows the positions of the components 6 and 16 when the manually operable actuator 8 has been released.

As illustrated in FIG. 8c, the second latch 11 still prevents extension of the connecting bar 1 but allows retraction thereof.

Thus, the connecting bar 1 may either be returned to the storage position or the second operation step may be performed in order for the connecting bar 1 to reach the extended end position.

When performing the second operation step, the wire 13 is once again pulled along the longitudinal axis in the direction D away from the coupling device 4 by means of operating the manually operable actuator 8. By pulling the wire, the first displaceable maneuvering element 14, which is connected to the wire via the spherical element 31, is displaced against the bias of the spring along the longitudinal axis L in the same direction D away from the coupling device 4. Due to the gap 35 between the first displaceable maneuvering element 14 and the second displaceable maneuvering element 16 and the resiliency of resilient leg 19d, the first displaceable maneuvering element 14 engages the first end 19a of the displaceable arm 19 which thereby is displaced along the longitudinal axis L to an operative position where the second end 19b of the arm 19 forces the second latch 11 against the bias thereof to the inactive state. When the second latch 11 is in its inactive state, the connecting bar 1 is allowed to extend to the extended end position. Once the manually operable actuator 8 is released, the second latch 11 is returned to the active state.

Figure 9A:
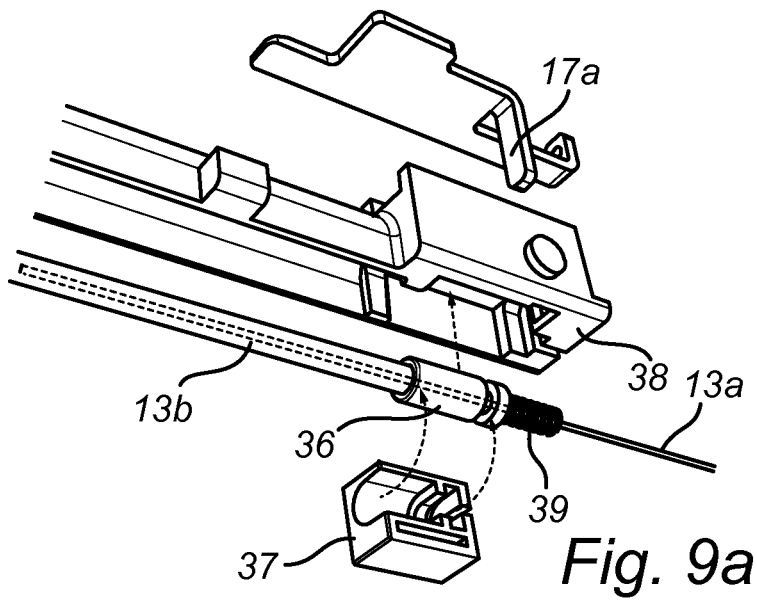
FIGS. 9a, 9b and 9c illustrate the function of a third operation step being actuated by means of the manually operable actuator. The coupling device is in release configuration.
Figure 9B:
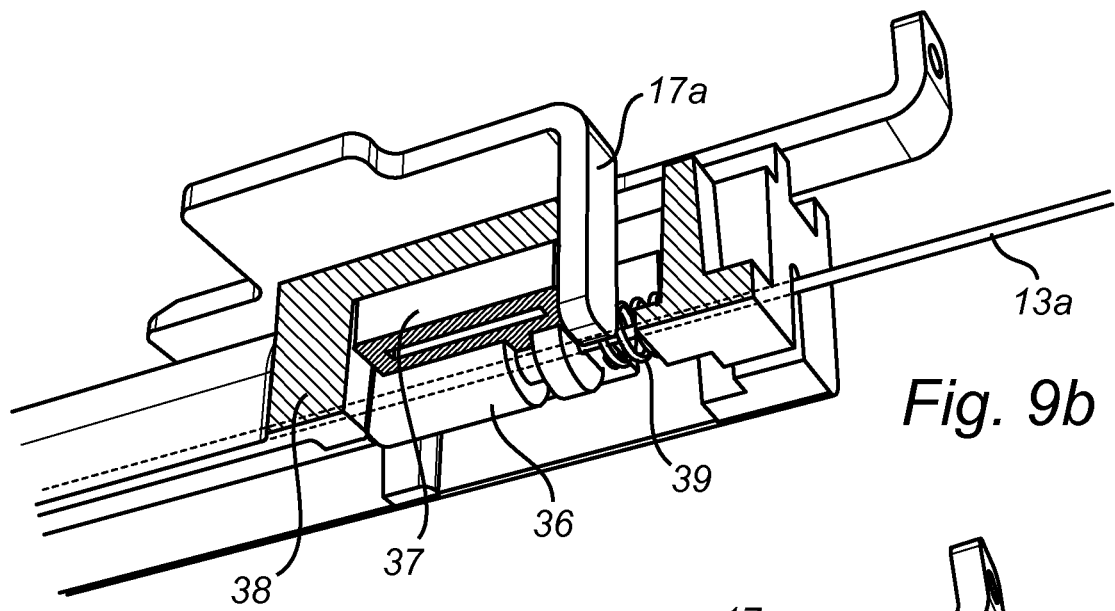
Figure 9C:
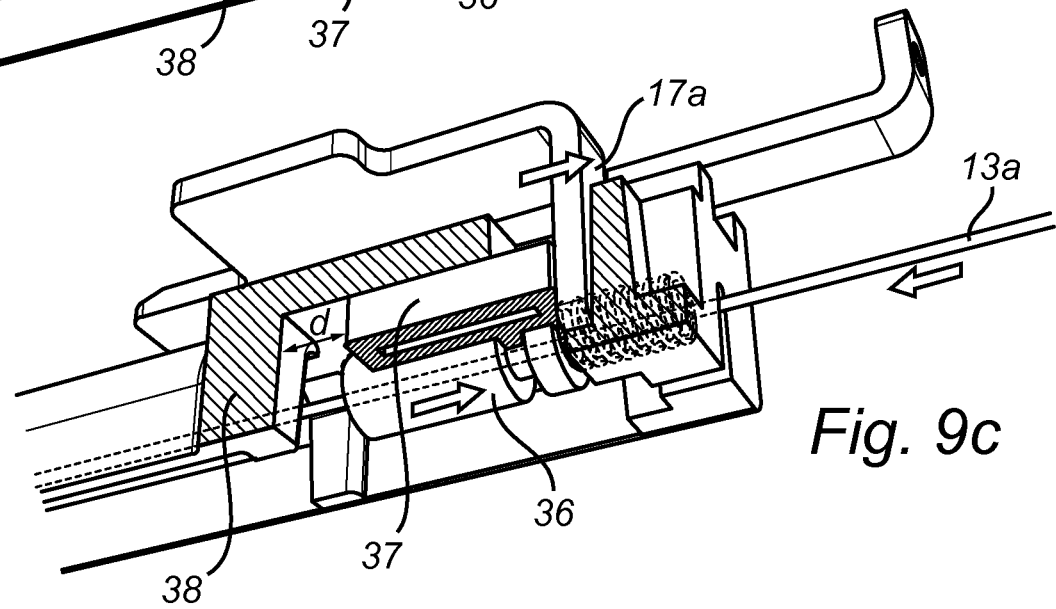

FIGS. 9a, 9b and 9c illustrate a third operation step by means of the manually operable actuator 8. The wire 13 includes an inner wire 13a axially arranged in an outer sheath 13b. The inner wire 13a is movable relative to the outer sheath 13b. The outer sheath 13b is fixed to a barrel 36 at the end of the outer sheath 13b which is proximal to the coupling device 4. The end of the outer sheath 13b which is distal to the coupling device 4 is fixed to the manually operable actuator 8.

The barrel 36 is arranged in a displaceable block element 37. The displaceable block element 37 is arranged in and displaceable a short distance d, such as about 5 mm, within an inner cavity of a fixed block element 38, see FIG. 9c. The displaceable block element 37 is displaceable within the inner cavity of the fixed block element 38 between a first position distal to the coupling device 4 and a second position proximal to the coupling device 4. The displaceable block element 37 is biased by spring 39 towards the first position distal to the coupling device 4.

When the inner wire 13a is pulled along the longitudinal axis L in a direction away from the coupling device 4, the displaceable block element 37 acts with a resulting force on the spring 37 until it is compressed and the displaceable block element 37 is displaced the distance d from the first position distal to the coupling device 4 to the second position proximal to the coupling device 4.

The displaceable lock element 17 has a longitudinal extension along the longitudinal axis L of the connecting bar 1. The displaceable lock element 17 is configured with a downwardly projecting part 17a. The downwardly projecting part 17a extends transversely to the longitudinal extension of the displaceable lock element 17. The downwardly projecting part 17a is arranged to extend into the inner cavity of the fixed block element 38. When the displaceable block element 37 displaces the short distance d from the first position to the second position within the inner cavity of the fixed block element 38, the displaceable block element 37 pushes on the downwardly projecting part 17a and the displaceable lock element 17 is then displaced the same distance d. When the displaceable lock element 17 thereby is displaced to its most proximal position, the displaceable lock element 17 will no longer lock the first latch 10.

Thus, the first latch 10 may be unlocked in the third operation step by means of the manually operable actuator 8. It may be noted that the displaceable block element 37 is displaced distance d also when the first and second operation steps are performed. However, the displacement of the displaceable block element 37 only serves a purpose when the connecting bar 1 is in the extended end position and the first latch 10 is locked by the displaceable lock element 17 as described above with regard to the third operation step.

Figure 10:
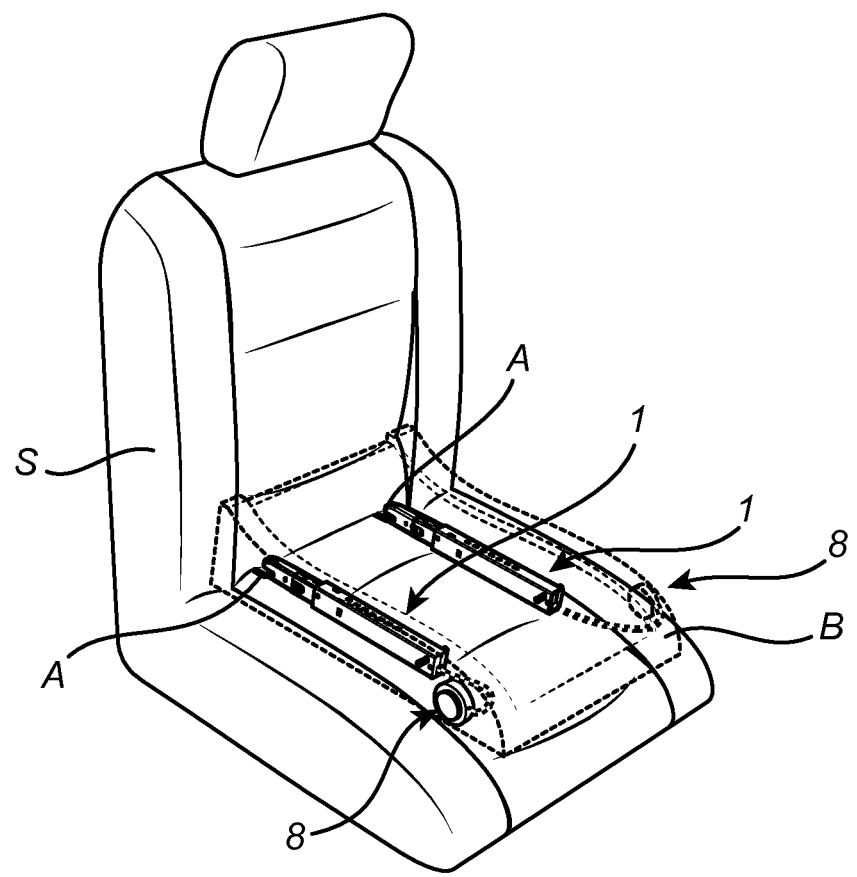
FIG. 10 is a perspective view illustrating a child safety seat, in this case a booster cushion, provided with adjustable connecting bars as disclosed herein.

FIG. 10 illustrates a child safety seat in the form of a booster cushion B provided with a pair of connecting bars 1 as disclosed herein. The connecting bars 1 are integrated within the booster cushion B and the two connecting bars 1 together form an adjustable mounting arrangement for releasable fastening of the booster cushion B to fixedly mounted generally U-shaped rod-like anchoring members A normally available at the bottom of the backrest of a passenger vehicle seat S. A booster cushion B is shown in FIG. 10, but it should be understood that the adjustable connecting bar 1 as disclosed herein also may be used to fasten any other child restraint system (child safety seat) to a vehicle seat S having mounted anchoring members A, such as fixedly mounted anchoring members. As described in the introductory part, child restraint systems include cushioned seat shells having seat and back portions, booster cushions with or without side bolsters, and baby carriers. The child safety seats may be integral or may include a seat/booster/baby carrier mounted on a chassis (base). In the latter case, the adjustable connecting bar as disclosed herein may be used to fasten the chassis to a vehicle seat having mounted anchoring members. The terms "child restraint system" and "child safety seat" are herein used interchangeably.

Once the coupling devices 4 of the connecting bars 1 have been fastened to the anchoring members, such as Isofix anchors, of a vehicle seat S, the length of the connecting bars 1 can be adjusted by pushing the booster cushion B as far as possible against the backrest of the vehicle seat S. Each connecting bar 1 may then be in any intermediate position.

If the connecting bars 1 are operatively connected together, e.g. via a transverse bar or any similar arrangement, the mounting arrangement may comprise a single manually operable actuator arranged to simultaneously transform each coupling device 4 from the locked configuration to the release configuration.

In case the adjustable mounting arrangement contains a pair of separate connecting bars 1, each connecting bar 1 may comprise a manually operable actuator 8 as illustrated in FIG. 10.

The adjustable mounting arrangement may be integral with a child safety seat. More particularly, the adjustable mounting arrangement, including the connecting bars 1, may be integrated within the bottom part of the child safety seat, e.g. a chassis (base) onto which a seat/booster/baby carrier is to be mounted. Thus, when the connecting bars 1 are in the retracted end position (storage position), the connecting bars 1 may be substantially contained within the booster cushion which means that the booster cushion will be easy to carry and stow since no connectors are projecting therefrom.

A great advantage with the adjustable connecting bar in accordance with the invention is that the entire fastening and adjustment mechanism is integrated within the connecting bar 1. This configuration is space-saving and provides for a compact design. This is particularly advantageous for child safety seats which should be easy to move and transport. Moreover, the integration of an adjustable mounting arrangement containing a pair of the connecting bars as 1 disclosed herein in a child safety seat provides for greater design freedom since less consideration needs to be taken in providing enough space for the connecting bars 1. Alternatively, space in the child safety seat which is normally taken up by the mounting arrangement may be used for other arrangements or mechanisms.

While the invention has been described in detail and with reference to specific embodiments thereof, it will be apparent for one skilled in the art that various changes and modifications can be made therein without departing from the scope thereof.

The invention claimed is:

1. An adjustable connecting bar for releasable fastening of a child restraint system to a vehicle seat (S) having a mounted anchoring member (A), the connecting bar comprising a first elongated bar member and a second elongated bar member telescopically interconnected and arranged for relative displacement along a longitudinal axis (L) between a retracted end position and an extended end position of the connecting bar, the first elongated bar member being provided with a coupling device at an end thereof, the coupling device comprising a movable coupling member for engaging the anchoring member (A), the coupling device being transformable between a locked configuration and a release configuration, the coupling device comprising a displaceable latch member biased to engagement with the movable coupling member to latch the movable coupling member in the locked configuration, the coupling device being transformable from said locked configuration to said release configuration in a first operation step by means of a manually operable actuator operatively connected via a maneuvering system to the displaceable latch member for selectively disengaging the displaceable latch member from the movable coupling member, said connecting bar comprises a latch system (10, 11) housed within the connecting bar for selectively preventing extension and retraction of the connecting bar (1), the latch system comprising a first latch and a second latch (11), said first latch being operatively connected via the maneuvering system to the displaceable latch member (6), said first latch being arranged to lock said connecting bar in said extended end position and to prevent retraction of said connecting bar when said connecting bar is in said extended end position and said coupling device is in said release configuration, and said first latch being arranged to allow retraction of said connecting bar when said coupling device is in said locked configuration, said second latch being arranged to be transferrable from an active state to an inactive state, said second latch being arranged to in said active state prevent extension and to allow retraction of said connecting bar, and said second latch being arranged to in said inactive state allow both extension and retraction of said connecting bar, characterized in that said second latch is biased to the active state and transferrable from the active state to the inactive state in a second operation step by means of the manually operable actuator, the second operation step being separate from the first operation step and only allowed when the coupling device is in the release configuration, and the second latch being arranged to return to the active state upon release of the manually operable actuator.

2. An adjustable connecting bar according to claim 1, wherein the maneuvering system is housed within the first elongated bar member and comprises
   a wire connected to the manually operable actuator, the wire being arranged such that operation of the manually operable actuator pulls the wire along the longitudinal axis (L) in a direction away from the coupling device;
   a first displaceable maneuvering element arranged to be responsive to said movement of the wire and displaceable therewith, the first displaceable maneuvering element being biased to a first position proximal to the coupling device;
   a second displaceable maneuvering element arranged to be responsive to movement of the displaceable latch member and displaceable therewith;
   a displaceable lock element arranged to be responsive to movement of the second displaceable maneuvering element and displaceable therewith, the displaceable lock element being arranged to lock the first latch when the coupling device is in the release configuration and the connecting bar is in said extended end position.

3. An adjustable connecting bar according claim 2, which is arranged such that operation of the manually operable actuator in the first operation step allows displacement of the first displaceable maneuvering element against the bias thereof along the longitudinal axis (L) to a second position distal to the coupling device, the first displaceable maneuvering element thereby pushing the second displaceable maneuvering element from a first position proximal to the coupling device along the longitudinal axis (L) to a second position distal to the coupling device resulting in the displaceable latch member displacing therewith and thereby disengaging from the movable coupling member such that the coupling device is transformed to the release configuration, the first displaceable maneuvering element being biased back to the first position upon release of the manually operable actuator.

4. An adjustable connecting bar according to claim 2, which is arranged such that the second operation step allows displacement of the first displaceable maneuvering element against the bias thereof along the longitudinal axis (L) towards engagement with a first end of a displaceable arm, the displaceable arm thereby being displaced to an operative position where a second end of the arm forces the second latch against the bias thereof to the inactive state.

5. An adjustable connecting bar according to claim 4, wherein the second displaceable maneuvering element is arranged to prevent engagement between the displaceable arm and the first displaceable maneuvering element when the coupling device is in the locked configuration.

6. An adjustable connecting bar according to any one of claim 3, which is arranged such that transformation of the coupling device from the release configuration to the locked configuration is arranged to allow the displaceable latch member to displace along the longitudinal axis (L) and thereby engage the movable coupling member, the displacement of the displaceable latch member being arranged to allow displacement of the second displaceable maneuvering element to the first position proximal to the coupling device, and the displacement of the second displaceable maneuvering element being arranged to allow displacement of the displaceable lock element such that the first latch is unlocked.

7. An adjustable connecting bar according to any one of claim 2, further comprising a displaceable block element arranged to be responsive to movement of the wire and reversibly displaceable therewith along the longitudinal axis (L) in a direction towards the coupling device, the displaceable block element being biased away from the coupling device, displacement of the displaceable block element in the direction towards the coupling device being arranged to allow displacement of the displaceable lock element along therewith when the connecting bar is in the extended end position and the coupling device is in the release configuration such that the first latch is unlocked.

8. An adjustable connecting bar according to claim 1, further comprising a biasing member arranged to bias the first elongated bar member away from the second elongated bar member, the second latch being housed within the first elongated bar member and configured with a first locking member at an end thereof, the first locking member being capable of engaging a second locking member housed within the second elongated bar member when the connecting bar is in the retracted end position thereby holding the first elongated bar member against the bias of the biasing member, the second operation step allowing the first locking member to disengage from the second locking member such that the first elongated bar member is ejected and the connecting bar is extended to the extended end position.

9. An adjustable connecting bar according to claim 1, wherein the second elongated bar member is arranged to at least party encase a part of the first elongated bar member, the first elongated bar member being provided along the longitudinal axis with a first aperture proximal to the coupling device and a second aperture distal to the coupling device, each of the first and second apertures extending along a respective center line parallel to the longitudinal axis (L), the center lines of the first and second apertures being non-coinciding, the second elongated bar member being provided along the longitudinal axis (L) with a series of apertures, the series of apertures being arranged to overlap the second aperture of the first elongated bar member, the first latch being biased to engage the first aperture of the first elongated bar member and any optional overlapping aperture of the second elongated bar member, and the second latch being biased to engage the second aperture of the first elongated bar member and any overlapping aperture of the series of apertures of the second elongated bar member.

10. An adjustable mounting arrangement for releasable fastening of a child safety seat to a vehicle seat having mounted anchoring members, the arrangement comprising a pair of adjustable connecting bars, characterized in that each of the adjustable connecting bars is an adjustable connecting bar according to claim 1.

11. A child restraint system arranged for releasable fastening to a vehicle seat characterized in comprising an adjustable mounting arrangement according to claim 10.

* * * * *